United States Patent
Feng

(10) Patent No.: US 11,140,729 B2
(45) Date of Patent: Oct. 5, 2021

(54) RELAY TRANSMISSION METHOD AND DEVICE

(71) Applicant: GUANGDONG OPPO MOBILE TELECOMMUNICATIONS CORP., LTD., Guangdong (CN)

(72) Inventor: Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/070,455

(22) PCT Filed: Mar. 30, 2016

(86) PCT No.: PCT/CN2016/077913
§ 371 (c)(1),
(2) Date: Jul. 16, 2018

(87) PCT Pub. No.: WO2017/166138
PCT Pub. Date: Oct. 5, 2017

(65) Prior Publication Data
US 2019/0029061 A1    Jan. 24, 2019

(51) Int. Cl.
*H04W 76/14* (2018.01)
*H04B 7/155* (2006.01)
(Continued)

(52) U.S. Cl.
CPC ........ *H04W 76/14* (2018.02); *H04B 7/15528* (2013.01); *H04W 72/121* (2013.01);
(Continued)

(58) Field of Classification Search
None
See application file for complete search history.

(56) References Cited

U.S. PATENT DOCUMENTS

2010/0302999 A1   12/2010  Hui
2011/0194485 A1    8/2011  Horneman
(Continued)

FOREIGN PATENT DOCUMENTS

CN    101820361 A    9/2010
CN    102098725 A    6/2011
(Continued)

OTHER PUBLICATIONS

International Search Report in international application No. PCT/CN2016/077913, dated Dec. 30, 2016.
(Continued)

*Primary Examiner* — Nicholas Sloms
(74) *Attorney, Agent, or Firm* — Ladas & Parry, LLP

(57) ABSTRACT

Disclosed in the present invention are a relay transmission method and device, enabling reduction of complexity and latency of data processing. The method comprises: a relay terminal apparatus receives a first layer-two PDU sent by a transmitting-end apparatus to a receiving-end apparatus, wherein the first layer-two PDU carries identifier information of a remote terminal apparatus, or the first layer-two PDU schedules a scrambled PDCCH by means of an RNTI of the remote terminal apparatus; the relay terminal apparatus generates, according to the first layer-two PDU, a second layer-two PDU; and the relay terminal apparatus sends to the receiving-end apparatus the second layer-two PDU, wherein the transmitting-end apparatus is the remote terminal apparatus, and the receiving-end apparatus is a network apparatus; alternatively, the transmitting-end apparatus is a network apparatus, and the receiving-end apparatus is the remote terminal apparatus.

13 Claims, 8 Drawing Sheets

(51) Int. Cl.

| | | |
|---|---|---|
| *H04W 76/22* | (2018.01) | |
| *H04W 76/11* | (2018.01) | |
| *H04W 72/12* | (2009.01) | |
| *H04W 72/14* | (2009.01) | |
| *H04W 80/08* | (2009.01) | |
| *H04W 88/04* | (2009.01) | |
| *H04W 4/70* | (2018.01) | |
| *H04W 80/02* | (2009.01) | |

(52) U.S. Cl.
CPC ....... *H04W 72/1289* (2013.01); *H04W 72/14* (2013.01); *H04W 76/11* (2018.02); *H04W 76/22* (2018.02); *H04W 80/08* (2013.01); *H04W 88/04* (2013.01); *H04W 4/70* (2018.02); *H04W 80/02* (2013.01)

(56) References Cited

U.S. PATENT DOCUMENTS

| | | | |
|---|---|---|---|
| 2012/0008547 | A1 | 1/2012 | Yokoyama |
| 2012/0294228 | A1 | 11/2012 | Song |
| 2013/0064116 | A1 | 3/2013 | Speight |
| 2014/0226558 | A1 | 8/2014 | Speight |
| 2015/0029913 | A1 | 1/2015 | Zhou et al. |
| 2015/0029926 | A1 | 1/2015 | Ryu et al. |
| 2016/0323777 | A1 | 11/2016 | Pan et al. |
| 2017/0118133 | A1* | 4/2017 | Meylan ............... H04W 88/06 |
| 2017/0142761 | A1* | 5/2017 | Zhang ............... H04W 74/08 |
| 2018/0146452 | A1* | 5/2018 | Zhang ............... H04W 24/04 |
| 2018/0192461 | A1 | 7/2018 | Naik et al. |
| 2018/0213577 | A1* | 7/2018 | Burbidge ............... H04W 76/10 |
| 2018/0255499 | A1* | 9/2018 | Loehr ............... H04B 7/2606 |
| 2019/0059015 | A1* | 2/2019 | Lee ............... H04W 28/02 |
| 2019/0166486 | A1* | 5/2019 | Tang ............... H04W 88/04 |

FOREIGN PATENT DOCUMENTS

| | | |
|---|---|---|
| CN | 102318431 A | 1/2012 |
| CN | 102759784 A | 10/2012 |
| CN | 102957474 A | 3/2013 |
| CN | 103379651 A | 10/2013 |
| CN | 103733720 A | 4/2014 |
| CN | 103814596 A | 5/2014 |
| CN | 105451208 A | 3/2016 |
| JP | 2014527763 A | 10/2014 |
| WO | 2010113267 A1 | 10/2010 |
| WO | 2015125479 A1 | 8/2015 |
| WO | 2015128537 A1 | 9/2015 |
| WO | 2015142425 A1 | 9/2015 |
| WO | 2016015296 A1 | 2/2016 |
| WO | 2016020072 A1 | 2/2016 |

OTHER PUBLICATIONS

The Written Opinion of the International Search Authority in international application No. PCT /CN2016/077913, dated Dec. 30, 2016.
Alcatel-Lucent Shanghai Bell et al: "Consideration on traffic multiplexing for relay operation", 3GPP Draft; R2-094343, 3rd Generation Partnership Project (3GPP), Mobile Competence Centre ; 650, Route Des Lucioles ; F-06921 Sophia-Antipolis Cedex; France, no. Shenzhen, China; Aug. 17, 2009, Aug. 17, 2009 (Aug. 17, 2009), XP050352580, [retrieved on Aug. 17, 2009].
Supplementary European Search Report in the European application No. 16895919.5, dated Jul. 8, 2019.
English translation of the Written Opinion of the International Search Authority in the international application No. PCT/CN2016/077913, dated Dec. 30, 2016.
ZTE,Considerations on the UE—Network Relays[online],3GPP TSG—RANWG2#89bis R2-151169, the Internet <URL:http://www.3gpp.org/ftp/tsg_ran/WG2_RL2/TSGR2_89bis/Docs/R2- 151169.zip>,2015. Apr. 24, 2015.
First Office Action of the Japanese application No. 2018-538562, dated Dec. 24, 2019.
Third Generation Partnership Project,"Technical Specification Group Radio Access Network; Study on Further Enhancements to LTE Device to Device (D2D), User Equipment (UE) to network relays for Internet of Things (IoT) and wearables; (Release 15)," 3GPP TR 36.746 V15.1.1 (Apr. 2018) (Year: 2018).
Motivation for SI: Further LTE D2D Enhancements for Wearables and MTC [online], 3GPP TSG-RAN#71 RP-160427, <URL:http://www.3gpp.org/ftp/tsg_ran/TSG_RAN/TSGR_71/Docs/RP-160427.zip>, issued on Mar. 10, 2016.
First Office Action of the Japanese application No. 2018-557077, dated Feb. 28, 2020.
First Office Action of the Chinese application No. 201680079192.7, dated Jun. 2, 2020, with search report.
Office Action of the Indian application No. 201817033703, dated Jun. 23, 2020.
International Search Report in the international application No. PCT/CN2016/084810, dated Mar. 2, 2017.
English translation of the Written Opinion of the International Search Authority in the international application No. PCT/CN2016/084810, dated Mar. 2, 2017.
Extended European Search Report in the European application No. 16903571.4, dated Jan. 17, 2019.
Huawei et al:"L2 UE Relay technology consideration for wearable", 3GPP Draft; R2-162642 L2 Relay Technology Consideration for Wearable, 3rd Generation Partnership Project (3GPP), Mobile Competence Centre; 650, Route Des Lucioles; F-06921 Sophia-Antipolis Cedex; F, vol. RAN WG2, no. Dubrovnik, Croatia; Apr. 11, 2016-Apr. 5, 2016 Apr. 2, 2016(Apr. 2, 2016), XP051082482, Retrieved from the Internet: URL: http://www.3gpp.org/ftp/tsg_ran/WG2_RL2/TSGR2_93bis/Docs/[retrieved on Apr. 2, 2016]*Chapter 4.2 Chapter 2.1 Concept of L2UE Relay* *Chapter 2.2 User plane stack for L2 UE Relay*.
"3rd Generation Partnership Project; Technical Specification Group Radio Access Network; Evolved Universal Terrestrial Radio Access (E-UTRA); LTE-WLAN Aggregation Adaptation Protocol (LWAAP) specification (Release 13)", 3GPP Standard; 3GPP TS 36.360, 3rd Generation Partnership Project (3GPP), Mobile Competence Centre; 650, Route Deslucioles; F-06921 Sophia-Antipolis Cedex; France, vol. RAN WG2, no. VI3.0.0, Apr. 7, 2016 (Apr. 7, 2016), pp. 1-9, XP051088563, [retrieved on Apr. 7, 2016] *Chapter 4.2 Chapter 4.2 LWAAP architecture* *Chapter 4.3 Services* *Chapter 6.1.2 LWAAP data PDU*.
Ericsson:"Relaying scenarios for wearables", 3GPP Draft; R2-163949—Relaying Scenarios for Wearables, 3rd Generation Partnership Project (3GPP), Mobile Competence Centre; 650, Route Des Lucioles ; F-06921 Sophia-Antipolis Cedex ; France, vol. • RAN WG2, no. Nanjing, P. R. /China; May 23, 2016-May 27, 2016 May 22, 2016 (May 22, 2016), XP051105307 Retrieved from the Internet: URL:http://www.3gpp.org/ftp/Meetings_3GPP_SYNC/RAN2/Docs/[retrieved on May 22, 2016]*Chapter 2.1 L2 relaying.
Huawei et al: "Feasibility of Bluetooth for UE relay", 3GPP Draft; R2-163601, 3rd Generation Partnership Project (3GPP), Mobile Competence Centre; 650, Route Des Lucioles ; F-0692 Sophia-Antipolis Cedex; France, vol. RAN WG2, no. Nanjing, China; May 23, 2016-May 27, 2016 May 22, 2016 (May 22, 2016), XP051105046, Retrieved from the Internet: URL:http://www.3gpp.org/ftp/Meetings_3GPP_SYNC/RAN2/Docs/[retrieved on May 22, 2016]*Chapter 2.1 Protocol stackes.
First Office Action of the Japanese application No. 2020-98527, dated May 11, 2021.
First Office Action of the European application No. 16895919.5, dated Jul. 15, 2021.

\* cited by examiner

RELAY TRANSMISSION METHOD AND DEVICE

RELATED APPLICATION

This application is an application under 35 U.S.C. 371 of International Application No. PCT/CN2016/077913 filed on Mar. 30, 2016, the entire contents of which are incorporated herein by reference.

TECHNICAL FIELD

Embodiments of the disclosure relate to the field of communications, and more particularly to a relay transmission method and device.

BACKGROUND

A Device-to-Device (D2D) technology refers to that neighboring terminal equipment may perform data transmission in a direct link manner in a short-distance range and network equipment for forwarding is not required. A licensed frequency band resource may be shared between D2D communication and a cellular system to form a unified hybrid cellular-D2D network. In the hybrid network, part of terminal equipment may still work in a cellular communication mode, namely communicating with other terminal equipment through network equipment, while part of terminal equipment may work in a D2D communication mode, namely performing direct data transmission with the other terminal equipment through D2D links with the other terminal equipment.

In addition, data transmission between network equipment and terminal equipment may be assisted through a D2D relay. In such case, a D2D communication mode is adopted between the D2D relay and a D2D terminal, while a cellular communication mode is used between the D2D relay and the network equipment. The D2D relay receives and forwards data in a half duplex manner, and performs mode switching in a receiving and forwarding process.

In a conventional art, a D2D relay relays data transmission between a D2D terminal and network equipment through an Internet Protocol (IP) layer (i.e., layer 3), and for a received data packet, is required to perform decapsulation processing sequentially through layer 1 (i.e., a Physics (PHY) layer), layer 2 (including a Media Access Control (MAC) layer, a Radio Link Control (RLC) layer and a Packet Data Convergence Protocol (PDCP) layer) and layer 3 and perform encapsulation processing sequentially through layer 3, layer 2 and layer 1 to implement data relaying. Therefore, complexity is relatively high, and a data processing delay is relatively long.

SUMMARY

The embodiments of the disclosure provide a relay transmission method and device, which may reduce processing complexity in relay transmission and reduce a data delay.

A first aspect provides a relay transmission method, which may include that: relay terminal equipment receives a first layer-2 Protocol Data Unit (PDU) which is intended to be sent from a sender equipment to a receiver equipment, wherein the first layer-2 PDU may contain identification information of a remote terminal equipment, or the first layer-2 PDU may be scheduled through a Physical Downlink Control Channel (PDCCH) scrambled by adopting a Radio Network Temporary Identity (RNTI) of the remote terminal equipment; the relay terminal equipment generates a second layer-2 PDU according to the first layer-2 PDU; and the relay terminal equipment sends the second layer-2 PDU to the receiver equipment, wherein the sender equipment may be the remote terminal equipment and the receiver equipment may be network equipment, or the sender equipment may be the network equipment and the receiver equipment may be the remote terminal equipment.

Optionally, a user-plane protocol stack, configured for relay transmission, of the relay terminal equipment may include layer 1 and layer 2, wherein layer 2 may include a MAC layer, or may further include at least one of an RLC layer and a PDCP layer.

Optionally, the user-plane protocol stack of the relay terminal equipment may not include layer 3 (i.e., an IP layer).

Optionally, the relay terminal equipment may forward data contained in the first layer-2 PDU to the receiver equipment according to the identification information or RNTI of the remote terminal equipment. Optionally, a receiver may generate the second layer-2 PDU in layer 2 according to the first layer-2 PDU, for example, performing encapsulation processing on the data contained in the first layer-2 PDU in layer 2 to obtain the second layer-2 PDU, and the second layer-2 PDU is sent to the receiver equipment.

Optionally, the relay terminal equipment may determine the remote terminal equipment corresponding to the first layer-2 PDU according to the identification information or RNTI of the remote terminal equipment, for example, identifying the identification information of the remote terminal equipment in layer 2 to determine the remote terminal equipment corresponding to the first layer-2 PDU, and forward the data contained in the first layer-2 PDU to the receiver equipment according to the remote terminal equipment. For example, the second layer-2 PDU sent to the receiver equipment by the relay terminal equipment contains the identification information of the remote terminal equipment, or the second layer-2 PDU is sent by adopting an uplink transmission resource allocated to the remote terminal equipment by the network equipment. Optionally, the uplink transmission resource allocated to the remote terminal equipment by the network equipment may be allocated by the network equipment according to a preamble, sent by the relay terminal equipment, corresponding to the remote terminal equipment, or is allocated by the network equipment according to a BSR, sent by the relay terminal equipment, containing the identification information of the remote terminal equipment.

In a first possible implementation mode of the first aspect, the identification information of the remote terminal equipment may include a layer-2 identifier of the remote terminal equipment or a terminal equipment identifier of the remote terminal equipment.

Optionally, the relay terminal equipment may identify the identification information of the remote terminal equipment in layer 2.

In combination with the abovementioned possible implementation mode, in a second possible implementation mode of the first aspect, the layer-2 identifier of the remote terminal equipment may be configured in one of a MAC layer, a PDCP layer and an RLC layer; or layer 2 of each of the remote terminal equipment and the network equipment may include an Adaptation (ADP) layer, the ADP layer may be located between the MAC layer and the PDCP layer, and the layer-2 identifier of the remote terminal equipment may be set in the ADP layer.

In such case, optionally, if the identification information (for example, the layer-2 identifier) of the remote terminal equipment is configured in the ADP layer, that is, encapsulation and identification are performed in the ADP layer, layer 2 of the relay terminal equipment may include the ADP layer, and the remote terminal equipment corresponding to the first layer-2 PDU is determined in the ADP layer.

Or, layer 2 of the relay terminal equipment may not include the ADP layer. In such case, the relay terminal equipment may not identify the remote terminal equipment corresponding to the first layer-2 PDU in layer 2 but directly perform encapsulation processing on the data contained in the first layer-2 PDU to generate the second layer-2 PDU. Optionally, the relay terminal equipment may contain a relay-specific Logical Channel Identifier (LCID) in the second layer-2 PDU sent to the network equipment to enable the network equipment to determine that the second layer-2 PDU contains relay data according to the relay-specific LCID and determine the remote terminal equipment corresponding to the second layer-2 PDU; or the relay terminal equipment may adopt a transmission resource configured for relay transmission to send the second layer-2 PDU to the remote terminal equipment to enable the remote terminal equipment to determine that the second layer-2 PDU contain the relay data according to the transmission resource and determine whether the second layer-2 PDU is sent to itself or not in the ADP layer.

In combination with the abovementioned possible implementation modes, in a third possible implementation mode of the first aspect, when the sender equipment is the network equipment and the receiver equipment is the remote terminal equipment, the identification information of the remote terminal equipment may include the layer-2 identifier of the remote terminal equipment, and the operation that the relay terminal equipment generates the second layer-2 PDU according to the first layer-2 PDU may include that: the relay terminal equipment determines the terminal equipment identifier corresponding to the layer-2 identifier; and the relay terminal equipment performs encapsulation processing on data contained in the first layer-2 PDU to generate the second layer-2 PDU, wherein the second layer-2 PDU may contain the corresponding terminal equipment identifier.

In combination with the abovementioned possible implementation modes, in a fourth possible implementation mode of the first aspect, when the sender equipment is the remote terminal equipment and the receiver equipment is the network equipment, before the operation that the relay terminal equipment generates the second layer-2 PDU according to the first layer-2 PDU, the method may further include that: the relay terminal equipment determines a preamble corresponding to the identification information of the remote terminal equipment; the relay terminal equipment sends the preamble to the network equipment; and the relay terminal equipment receives an uplink grant which is sent by the network equipment in response to the preamble, the uplink grant containing an uplink transmission resource allocated by the network equipment, wherein and the operation that the relay terminal equipment sends the second layer-2 PDU to the receiver equipment may include that: the relay terminal equipment adopts the uplink transmission resource to send the second layer-2 PDU to the network equipment.

In combination with the abovementioned possible implementation modes, in a fifth possible implementation mode of the first aspect, when the sender equipment is the remote terminal equipment and the receiver equipment is the network equipment, before the operation that the relay terminal equipment sends the second layer-2 PDU to the receiver equipment, the method may further include that: the relay terminal equipment sends a Buffer Status Report (BSR) to the network equipment, wherein the BSR may contain the identification information of the remote terminal equipment; and the relay terminal equipment receives the PDCCH which is sent by the network equipment according to the BSR, the PDCCH containing the identification information of the remote terminal equipment, wherein the operation that the relay terminal equipment sends the second layer-2 PDU to the receiver equipment may include that: the relay terminal equipment sends the second layer-2 PDU to the network equipment according to the PDCCH.

The PDCCY may contain the uplink grant. The relay terminal equipment may determine the uplink transmission resource allocated to the remote terminal equipment by the network equipment according to the uplink grant in the PDCCH and adopt the transmission resource to send the second layer-2 PDU.

In combination with the abovementioned possible implementation modes, in a sixth possible implementation mode of the first aspect, when the sender equipment is the remote terminal equipment and the receiver equipment is the network equipment, the identification information of the remote terminal equipment may include the terminal equipment identifier of the remote terminal equipment, and the operation that the relay terminal equipment generates the second layer-2 PDU according to the first layer-2 PDU may include that: the relay terminal equipment determines the layer-2 identifier corresponding to the terminal equipment identifier; and the relay terminal equipment performs encapsulation processing on the data contained in the first layer-2 PDU to generate the second layer-2 PDU, wherein the second layer-2 PDU may contain the corresponding layer-2 identifier.

In combination with the abovementioned possible implementation modes, in a seventh possible implementation mode of the first aspect, the PDU, which is transmitted through a D2D communication interface, of the first layer-2 PDU and the second layer-2 PDU may correspond to a technology adopted for D2D communication between the relay terminal equipment and the remote terminal equipment, and the layer-2 PDU transmitted through a cellular communication interface in the first layer-2 PDU and the second layer-2 PDU may specifically be a MAC PDU.

The D2D communication interface is specifically a communication interface between the remote terminal equipment and the relay terminal equipment, and for example, the D2D communication interface may specifically be a PC5 interface; and the cellular communication interface is a communication interface between the relay terminal equipment and the network equipment, and for example, the cellular communication interface may be a Uu interface.

Optionally, the PDU transmitted through the cellular communication interface may further specifically be an RLC PDU or a PDCP PDU.

Optionally, if the D2D communication technology is a SideLink (SL) technology of Long Term Evolution (LTE), the PDU transmitted through the PC5 interface may specifically be a MAC PDU, an RLC PDU or a PDCP PDU. Optionally, if the D2D communication technology is a Wireless Local Area Network (WLAN) technology, the PDU transmitted through the PC5 interface may specifically be a corresponding layer-2 PDU in a WLAN.

In combination with the abovementioned possible implementation modes, in an eighth possible implementation mode of the first aspect, the identification information of the remote terminal equipment may be born in a MAC Control Element (CE) field of the MAC PDU.

In combination with the abovementioned possible implementation modes, in a ninth possible implementation mode of the first aspect, the first layer-2 PDU may contain a relay-specific LCID; and before the operation that the relay terminal equipment generates the second layer-2 PDU according to the first layer-2 PDU, the method may further include that: the relay terminal equipment determines that the data contained in the first layer-2 PDU is required to be forwarded according to the relay-specific LCID.

Optionally, when the sender equipment is the remote terminal equipment and the receiver equipment is the network equipment, the second layer-2 PDU contains the relay-specific LCID. The network equipment may determine that the data contained in the second layer-2 PDU is forwarded by the relay terminal equipment according to the relay-specific LCID.

In combination with the abovementioned possible implementation modes, in a tenth possible implementation mode of the first aspect, when the sender equipment is the remote terminal equipment and the receiver equipment is the network equipment, the first layer-2 PDU may be sent by the remote terminal equipment by adopting a transmission resource configured for relay transmission; and before the operation that the relay terminal equipment generates the second layer-2 PDU according to the first layer-2 PDU, the method may further include that: the relay terminal equipment determines that the data contained in the first layer-2 PDU is required to be forwarded according to the transmission resource.

Optionally, when the sender equipment is the network equipment and the receiver equipment is the remote terminal equipment, the relay terminal equipment may send the second layer-2 PDU to the remote terminal equipment through the transmission resource for relay transmission. The remote terminal equipment may determine that the data contained in the second layer-2 PDU is forwarded by the relay terminal equipment according to the transmission resource occupied by the second layer-2 PDU.

In combination with the abovementioned possible implementation modes, in an eleventh possible implementation mode of the first aspect, when the sender equipment is the network equipment and the receiver equipment is the remote terminal equipment, the first layer-2 PDU may be scheduled by the network equipment through a PDCCH scrambled by a relay-specific RNTI; and before the operation that the relay terminal equipment generates the second layer-2 PDU according to the first layer-2 PDU, the method may further include that: the relay terminal equipment determines that the data contained in the first layer-2 PDU is required to be forwarded according to the relay-specific RNTI adopted for the PDCCH configured to schedule the first layer-2 PDU.

In such case, the first layer-2 PDU received by the relay terminal equipment is scheduled by the relay terminal equipment through the PDCCH addressed by a relay-specific RNTI.

Optionally, if the receiver equipment is the network equipment and layer 2 of the network equipment includes the ADP layer, the second layer-2 PDU may contain the relay-specific LCID, wherein the relay-specific LCID may be configured for the network equipment to determine that the second layer-2 PDU is forwarded through the relay terminal equipment.

In such case, optionally, the second layer-2 PDU may not contain the identification information of the remote terminal equipment.

In combination with the abovementioned possible implementation modes, in a twelfth possible implementation mode of the first aspect, before the operation that the relay terminal equipment receives the first layer-2 PDU sent by the sender equipment, the method may further include that: the relay terminal equipment receives a connection establishment request of the remote terminal equipment, the connection establishment request being configured to request for establishment of a D2D communication link between the relay terminal equipment and the remote terminal equipment; the relay terminal equipment sends a bearer establishment request to core network equipment in response to the connection establishment request, the bearer establishment request containing the terminal equipment identifier of the remote terminal equipment to enable the core network equipment and the network equipment to establish an Evolved Packet System (EPS) bearer of the remote terminal equipment; and the relay terminal equipment receives a bearer establishment response sent by the network equipment, the bearer establishment response containing configuration information of the EPS bearer, wherein the EPS bearer may include a cellular data transmission channel between the network equipment and the relay terminal equipment and a D2D data transmission channel between the relay terminal equipment and the remote terminal equipment.

In combination with the abovementioned possible implementation modes, in a thirteenth possible implementation mode of the first aspect, the configuration information of the EPS bearer may include PHY-layer configuration information and layer-2 configuration information.

In such case, the configuration information of the EPS bearer may include the PHY-layer configuration information and the layer-2 configuration information, wherein the layer-2 configuration information may optionally include configuration information of a layer related to relay transmission in layer 2, and for example, the layer-2 configuration information may include configuration information of a layer configured to identify the identification information of the remote terminal equipment in layer 2, for example, MAC-layer configuration information.

Optionally, the PHY-layer configuration information may include information of the transmission resource configured for relay transmission and/or at least one of the RNTI and preamble allocated to the remote terminal equipment, for example, information of a first transmission resource configured for relay transmission between the relay terminal equipment and the remote terminal equipment and/or information of a second transmission resource configured for relay transmission between the relay terminal equipment and the network equipment.

Optionally, the layer-2 configuration information may include the layer-2 identifier and/or relay-specific LCID allocated to the remote terminal equipment.

Optionally, the method further includes that: the relay terminal equipment sends the information of the first transmission resource and/or the layer-2 identifier to the remote terminal equipment.

In combination with the abovementioned possible implementation modes, in a fourteenth possible implementation mode of the first aspect, the configuration information of the EPS bearer may further include at least one of PDCP-layer configuration information or RLC-layer configuration information; and the method may further include that: the PDCP-layer configuration information and/or the RLC-layer configuration information are/is sent to the remote terminal equipment to enable the remote terminal equipment to perform configuration according to the PDCP-layer configuration information and/or the RLC-layer configuration information.

A second aspect provides another relay transmission method, which may include that: sender equipment performs encapsulation processing on data to be sent to a receiver equipment to generate a first layer-2 PDU, wherein the first layer-2 PDU may contain identification information of a remote terminal equipment, or the first layer-2 PDU may be scheduled through a PDCCH scrambled by adopting an RNTI of the remote terminal equipment; and the sender equipment sends the first layer-2 PDU to a relay terminal equipment, wherein the sender equipment may be the remote terminal equipment and the receiver equipment may be network equipment, or the sender equipment may be the network equipment and the receiver equipment may be the remote terminal equipment.

In a first possible implementation mode of the second aspect, the identification information of the remote terminal equipment may include a terminal equipment identifier of the remote terminal equipment or a layer-2 identifier of the remote terminal equipment.

In combination with the abovementioned possible implementation mode, in a second possible implementation mode of the second aspect, the layer-2 identifier of the remote terminal equipment may be set in one of a MAC layer, a PDCP layer and an RLC layer; or layer 2 of the sender equipment may include an ADP layer, the ADP layer may be located between the MAC layer and the PDCP layer, and the layer-2 identifier of the remote terminal equipment may be set in the ADP layer.

In combination with the abovementioned possible implementation modes, in a third possible implementation mode of the second aspect, when the sender equipment is the network equipment, the first layer-2 PDU may specifically be a MAC PDU; and when the sender equipment is the remote terminal equipment, the first layer-2 PDU may correspond to a D2D communication technology between the remote terminal equipment and the relay terminal equipment.

In combination with the abovementioned possible implementation modes, in the third possible implementation mode of the second aspect, the identification information of the remote terminal equipment may be born in a MAC CE field of the MAC PDU.

In combination with the abovementioned possible implementation modes, in a fourth possible implementation mode of the second aspect, the first layer-2 PDU may contain a relay-specific LCID, and the relay-specific LCID may be configured for the relay terminal equipment to determine that the data contained in the first layer-2 PDU is required to be forwarded.

In combination with the abovementioned possible implementation modes, in a fifth possible implementation mode of the second aspect, when the sender equipment is the remote terminal equipment, the operation that the sender equipment sends the first layer-2 PDU to the relay terminal equipment may include that: the remote terminal equipment adopts a transmission resource configured for relay transmission to send the first layer-2 PDU to the relay terminal equipment.

In combination with the abovementioned possible implementation modes, in a sixth possible implementation mode of the second aspect, when the sender equipment is the network equipment, before the operation that the sender equipment sends the first layer-2 PDU to the relay terminal equipment, the method may further include that: the sender equipment sends a PDCCH scrambled by adopting a relay-specific RNTI to the relay terminal equipment, the PDCCH being configured to schedule the first layer-2 PDU, wherein the relay-specific RNTI may be configured for the relay terminal equipment to determine that the data contained in the first layer-2 PDU is required to be forwarded.

In combination with the abovementioned possible implementation modes, in a seventh possible implementation mode of the second aspect, when the sender equipment is the network equipment, before the operation that the sender equipment generates the first layer-2 PDU, the method may further include that: the network equipment receives a bearer establishment request, the bearer establishment request containing the terminal equipment identifier of the remote terminal equipment; and the network equipment establishes an EPS bearer of the remote terminal equipment according to the bearer establishment request, wherein the EPS bearer may include a cellular data transmission channel between the network equipment and the relay terminal equipment and a D2D data transmission channel between the relay terminal equipment and the remote terminal equipment.

In combination with the abovementioned possible implementation modes, in an eighth possible implementation mode of the second aspect, the configuration information of the EPS bearer may include MAC-layer configuration information and PHY-layer configuration information; or the configuration information of the EPS bearer may further include at least one of PDCP-layer configuration information or RLC-layer configuration information.

Optionally, the PHY-layer configuration information may include information of the transmission resource configured for relay transmission and/or at least one of the RNTI and preamble allocated to the remote terminal equipment, for example, information of a first transmission resource configured for relay transmission between the relay terminal equipment and the remote terminal equipment and/or information of a second transmission resource configured for relay transmission between the relay terminal equipment and the network equipment.

Optionally, the layer-2 configuration information may include the layer-2 identifier and/or relay-specific LCID allocated to the remote terminal equipment.

A third aspect provides another relay transmission method, which may include that: receiver equipment receives a second layer-2 PDU sent by relay terminal equipment, the second layer-2 PDU being generated by the relay terminal equipment according to a first layer-2 PDU sent by sender equipment, the first layer-2 PDU containing identification information of a remote terminal equipment, or the first layer-2 PDU being scheduled through a PDCCH scrambled by adopting an RNTI of the remote terminal equipment; and the receiver equipment determines the remote terminal equipment corresponding to the second layer-2 PDU, wherein the sender equipment may be the remote terminal equipment and the receiver equipment may be network equipment, or the sender equipment may be the network equipment and the receiver equipment may be the remote terminal equipment.

In a first possible implementation mode of the third aspect, the identification information of the remote terminal equipment may include a terminal equipment identifier of the remote terminal equipment or a layer-2 identifier of the remote terminal equipment.

In combination with the abovementioned possible implementation mode, in a second possible implementation mode of the third aspect, the layer-2 identifier of the remote terminal equipment may be set in one of a MAC layer, a PDCP layer and an RLC layer; or layer 2 of each of the sender equipment and the receiver equipment may include an ADP layer, the ADP layer may be located between the MAC layer and the PDCP layer, and the layer-2 identifier of the remote terminal equipment may be set in the ADP layer.

In combination with the abovementioned possible implementation modes, in a third possible implementation mode of the third aspect, when the receiver equipment is the remote terminal equipment, the second layer-2 PDU may contain the terminal equipment identifier of the remote terminal equipment; and the operation that the receiver equipment determines the remote terminal equipment corresponding to the second layer-2 PDU may include that: the receiver equipment determines the remote terminal equipment corresponding to the second layer-2 PDU according to the terminal equipment identifier contained in the second layer-2 PDU.

In combination with the abovementioned possible implementation modes, in a fourth possible implementation mode of the third aspect, when the receiver equipment is the network equipment, before the operation that the receiver equipment receives the second layer-2 PDU sent by the relay terminal equipment, the method may further include that: the network equipment receives a preamble corresponding to the remote terminal equipment from the relay terminal equipment; and the network equipment sends an uplink grant to the relay terminal equipment according to the preamble, the uplink grant containing an uplink transmission resource allocated by the network equipment, wherein the operation that the receiver equipment receives the second layer-2 PDU sent by the relay terminal equipment may include that: the network equipment receives the second layer-2 PDU sent by the relay terminal equipment by adopting the uplink transmission resource; and the operation that the receiver equipment determines the remote terminal equipment corresponding to the second layer-2 PDU may include that: the relay terminal equipment determines the remote terminal equipment corresponding to the second layer-2 PDU according to the uplink transmission resource occupied by the second layer-2 PDU.

In combination with the abovementioned possible implementation modes, in a fifth possible implementation mode of the third aspect, when the receiver equipment is the network equipment, before the operation that the receiver equipment receives the second layer-2 PDU sent by the relay terminal equipment, the method may further include that: the network equipment receives a BSR sent by the relay terminal equipment, wherein the BSR may contain the identification information of the remote terminal equipment; and the network equipment sends the PDCCH to the relay terminal equipment according to the BSR, the PDCCH containing the identification information of the remote terminal equipment, wherein the operation that the receiver equipment determines the remote terminal equipment corresponding to the second layer-2 PDU may include that: the receiver equipment determines the remote terminal equipment corresponding to the second layer-2 PDU according to the PDCCH configured to schedule the second layer-2 PDU.

In combination with the abovementioned possible implementation modes, in a sixth possible implementation mode of the third aspect, when the receiver equipment is the network equipment, the identification information of the remote terminal equipment may include the terminal equipment identifier of the remote terminal equipment, and the second layer-2 PDU may contain the layer-2 identifier of the remote terminal equipment; and the operation that the receiver equipment determines the remote terminal equipment corresponding to the second layer-2 PDU may include that: the receiver equipment determines the remote terminal equipment corresponding to the second layer-2 PDU according to the layer-2 identifier contained in the second layer-2 PDU.

Optionally, if the receiver equipment is the network equipment and layer 2 of the network equipment includes an ADP layer, the second layer-2 PDU may contain a relay-specific LCID. In such case, the network equipment may determine that the second layer-2 PDU is forwarded through the relay terminal equipment according to the relay-specific LCID.

A fourth aspect provides a relay transmission device, which is configured to execute the method in the first aspect or any possible implementation mode of the first aspect. Specifically, the device includes units configured to execute the method in the first aspect or any possible implementation mode of the first aspect.

A fifth aspect provides another relay transmission device, which is configured to execute the method in the second aspect or any possible implementation mode of the second aspect. Specifically, the device includes units configured to execute the method in the second aspect or any possible implementation mode of the second aspect.

A sixth aspect provides another relay transmission device, which is configured to execute the method in the third aspect or any possible implementation mode of the third aspect. Specifically, the device includes units configured to execute the method in the third aspect or any possible implementation mode of the third aspect.

A seventh aspect provides another relay transmission device, which includes a storage unit and a processor, wherein the storage unit is configured to store an instruction, the processor is configured to execute the instruction stored in a memory, and when the processor executes the instruction stored in the memory, such execution enables the processor to execute the method in the first aspect or any possible implementation mode of the first aspect.

An eighth aspect provides another relay transmission device, which includes a storage unit and a processor, wherein the storage unit is configured to store an instruction, the processor is configured to execute the instruction stored in a memory, and when the processor executes the instruction stored in the memory, such execution enables the processor to execute the method in the second aspect or any possible implementation mode of the second aspect.

A ninth aspect provides another relay transmission device, which includes a storage unit and a processor, wherein the storage unit is configured to store an instruction, the processor is configured to execute the instruction stored in a memory, and when the processor executes the instruction stored in the memory, such execution enables the processor to execute the method in the third aspect or any possible implementation mode of the third aspect.

A tenth aspect provides a computer-readable medium, which is configured to store a computer program, the computer program including an instruction configured to execute the method in the first aspect or any possible implementation mode of the first aspect.

An eleventh aspect provides another computer-readable medium, which is configured to store a computer program, the computer program including an instruction configured to execute the method in the second aspect or any possible implementation mode of the second aspect.

A twelfth aspect provides another computer-readable medium, which is configured to store a computer program, the computer program including an instruction configured to execute the method in the third aspect or any possible implementation mode of the third aspect.

A thirteenth aspect provides a relay transmission system, which includes relay terminal equipment, remote terminal equipment and network equipment, wherein a user-plane protocol stack of the relay terminal equipment may include layer 1 and layer 2, a user-plane protocol stack of the remote terminal equipment may include layer 1, layer 2 and layer 3, and a user-plane protocol stack of the network equipment may include layer 1, layer 2 and layer 3, wherein layer 1 of the relay terminal equipment is an equivalent layer of layer 1 of the remote terminal equipment and layer 1 of the network equipment, layer 2 of the relay terminal equipment is an equivalent layer of layer 2 of the remote terminal equipment and layer 2 of the network equipment, and the remote terminal equipment, the relay terminal equipment and the network equipment may perform relay transmission in a layer-2 PDU manner.

Optionally, the user-plane protocol stack of the relay terminal equipment may only include layer 1 and layer 2 and does not include layer 3, and layer 2 of the relay terminal equipment is configured to identify the remote terminal equipment performing relay transmission. Optionally, layer 2 of the relay terminal equipment may be configured to identify and encapsulate an identifier of the remote terminal equipment, wherein the identifier of the remote terminal equipment may specifically be identification information of the remote terminal equipment, for example, a terminal equipment identifier or layer-2 identifier of the remote terminal equipment.

Optionally, layer 2 of each of the remote terminal equipment and the network equipment may include an ADP layer, and the ADP layer may be configured to identify the identifier of the remote terminal equipment. Optionally, the ADP layer may be located between a MAC layer and a PDCP layer.

Optionally, the relay terminal equipment may be the device in the fourth aspect or any possible implementation mode of the fourth aspect, sender equipment in the remote terminal equipment and the network equipment may be the device in the fifth aspect or any possible implementation mode of the fifth aspect, and receiver equipment in the remote terminal equipment and the network equipment may be the device in the sixth aspect or any possible implementation mode of the sixth aspect.

Optionally, the relay terminal equipment may be the device in the seventh aspect or any possible implementation mode of the seventh aspect, the sender equipment in the remote terminal equipment and the network equipment may be the device in the eighth aspect or any possible implementation mode of the eighth aspect, and the receiver equipment in the remote terminal equipment and the network equipment may be the device in the ninth aspect or any possible implementation mode of the ninth aspect.

On the basis of the technical solutions, according to the relay transmission method and device provided by the embodiments of the disclosure, the relay terminal equipment relays data between the remote terminal equipment and the network equipment in a layer-2 relay manner, wherein the layer-2 PDU sent to the relay terminal equipment by the remote terminal equipment or the network equipment contains the identification information of the remote terminal equipment, or the network equipment scrambles the PDCCH configured to schedule the layer-2 PDU through the RNTI of the remote terminal equipment, and the relay terminal equipment may determine the remote terminal equipment corresponding to the layer-2 PDU according to the identification information or RNTI of the remote terminal equipment and forward the data contained in the layer-2 PDU. Compared with a layer-3 relay manner adopted by the relay terminal equipment in the conventional art, such a manner may reduce processing complexity of the relay terminal equipment, reduce a transmission delay of the relay data and improve overall system performance.

BRIEF DESCRIPTION OF DRAWINGS

In order to describe the technical solutions of the embodiments of the disclosure more clearly, the drawings required to be used in descriptions about the embodiments of the disclosure or the conventional art will be simply introduced below. It is apparent that the drawings described below are only some embodiments of the disclosure. Other drawings may further be obtained by those of ordinary skilled in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skilled in the art on the basis of the embodiments in the disclosure without creative work shall fall within the scope of protection of the disclosure.

It is to be understood that terms "system" and "network" in the disclosure may usually be exchanged for use in the disclosure. Term "and/or" in the disclosure is only an association relationship describing associated objects and represents that three relationships may exist. For example, A and/or B may represent three conditions, i.e., independent existence of A, coexistence of A and B and independent existence of B. In addition, character "/" in the disclosure usually represents that previous and next associated objects form an "or" relationship.

Figure 1:
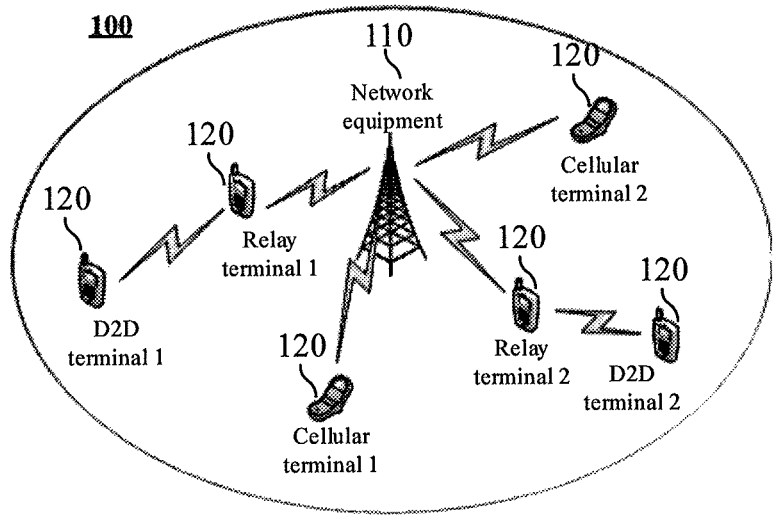
FIG. 1 is a schematic flowchart of a wireless communication system in which embodiments of the disclosure are applied.

FIG. 1 is a schematic diagram of a wireless communication system 100 in which embodiments of the disclosure are applied. The wireless communication system 100 may include at least one network equipment 110. The network equipment 110 may be equipment communicating with terminal equipment. Each network equipment 110 may provide communication coverage for a specific geographic region and may communicate with terminal equipment located in the coverage. The network equipment 110 may be a Base Transceiver Station (BTS) in a Global System for Mobile communications (GSM) or a Code Division Multiple Access (CDMA) system, may also be a NodeB (NB) in a Wideband Code Division Multiple Access (WCDMA) system, and may further be an Evolutional Node B (eNB or eNodeB) in an LTE system, or a radio controller in a Cloud Radio Access Network (CRAN), or the network equipment may be a relay station, an access point, vehicle-mounted equipment, wearable equipment, network-side equipment in a future 5th-Generation (5G) network, network equipment in a future evolved Public Land Mobile Network (PLMN) and the like.

The wireless communication system 100 further includes multiple terminal equipments 120 located in the coverage of the network equipment 110. The terminal equipment 120 may be mobile or fixed. The terminal equipment 120 may refer to an access terminal, User Equipment (UE), a user unit, a user station, a mobile station, a mobile radio station, a remote station, a remote terminal, a mobile equipment, a user terminal, a terminal, a wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), a handheld equipment with a wireless communication function, a computing equipment or other processing equipment connected to a wireless modem, a vehicle-mounted equipment, a wearable equipment, a terminal equipment in the future 5G network, a terminal equipment in the future evolved PLMN and the like.

FIG. 1 exemplarily shows one network equipment and six pieces of terminal equipment. Optionally, the wireless communication system 100 may include multiple pieces of network equipment and other numbers of terminal equipment may be included in coverage of each network equipment. There are no limits made in the embodiment of the disclosure. In addition, the wireless communication system 100 may further include another network entity such as a Mobile Management Entity (MME), a Serving Gateway (S-GW) and a Packet Data Network Gateway (P-GW), but the embodiment of the disclosure is not limited thereto.

Specifically, the terminal equipment 120 may perform communication in a cellular communication mode or a D2D communication mode. Here, in the cellular communication mode, the terminal equipment may communicate with the other terminal equipment through the network equipment. In the D2D communication mode, the terminal equipment may directly communicate with the other terminal equipment through a D2D link.

The multiple terminal equipments 120 illustrated in FIG. 1 include cellular terminal equipment, D2D terminal equipment and relay terminal equipment. Here, the cellular terminal equipment adopts a cellular communication technology to communicate with the network equipment 110, and the D2D terminal equipment implements data transmission with the network equipment through the relay terminal equipment. Here, between the relay terminal equipment and the D2D terminal equipment, there is a PC5 interface and a D2D communication technology is adopted for communication. Here, the D2D communication technology may specifically be an SL technology in LTE and may also be a technology such as Wireless Fidelity (WIFI) or Bluetooth in WLAN or another D2D communication technology, which is not limited in the embodiment of the disclosure. And between the relay terminal equipment and the network equipment, there is a Uu interface and the cellular communication technology is adopted for communication.

Figure 2A:
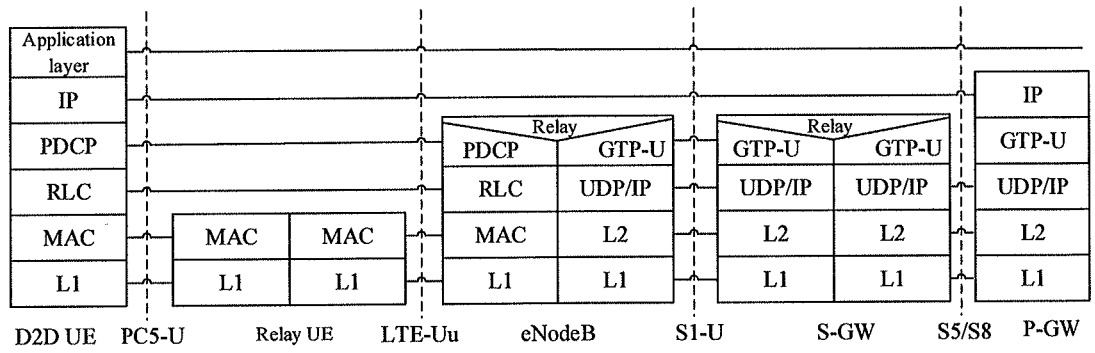
FIG. 2a is a schematic diagram of an example of a user-plane protocol stack, configured for relay communication, of various equipments according to an embodiment of the disclosure.
Figure 2B:
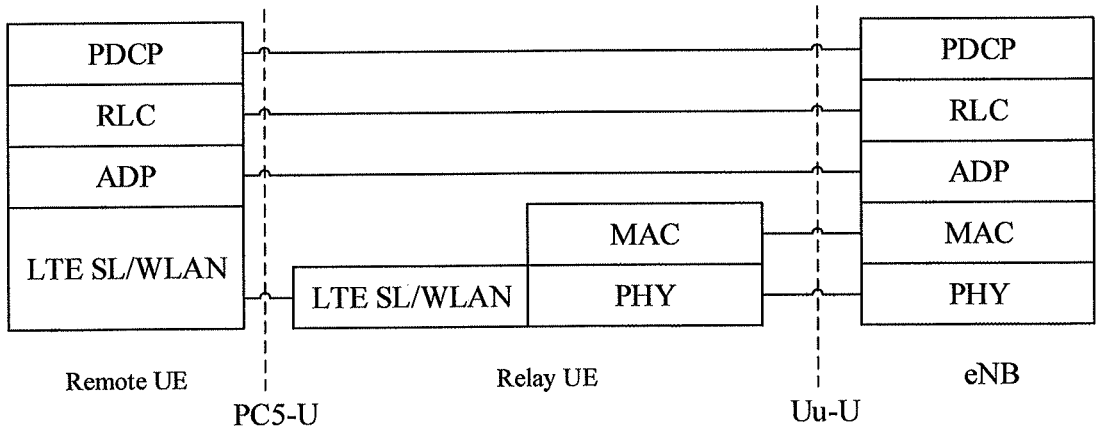
FIG. 2b is a schematic diagram of another example of a user-plane protocol stack, configured for relay communication, of various equipments according to an embodiment of the disclosure.

In the conventional art, the relay terminal equipment adopts a layer-3 relay manner for relaying, and a data processing delay is relatively long. In the embodiment of the disclosure, the relay terminal equipment may adopt a layer-2 relay manner to relay data transmission between the network equipment and the D2D terminal equipment, and In such case, a layer-2 PDU (for example, MAC PDU, RLC PDU or PDCP PDU) manner may be adopted for relay transmission at both of the Uu interface and the PC5 interface. FIG. 2a and FIG. 2b schematically show examples of a user-plane protocol stack, configured for relay transmission, of various equipments respectively. Here, a user-plane protocol stack of the relay terminal equipment may optionally include layer 1 and layer 2, a user-plane protocol stack of the D2D terminal equipment may include layer 1, layer 2 and layer 3, and a user-plane protocol stack of the network equipment may include layer 1, layer 2 and layer 3. Here, layer 1 of the relay terminal equipment is an equivalent layer of layer 1 of the D2D terminal equipment and layer 1 of the network equipment, and layer 2 of the relay terminal equipment is an equivalent layer of layer 2 of the D2D terminal equipment and layer 2 of the network equipment. In such case, the D2D terminal equipment, the relay terminal equipment and the network equipment may perform relay transmission in the layer-2 PDU manner.

In such case, the user-plane protocol stack of the relay terminal equipment may optionally only include layer 1 and layer 2 and does not include layer 3. Optionally, layer 2 of the relay terminal equipment is configured to identify the remote terminal equipment performing relay transmission. For example, layer 2 of the relay terminal equipment may be configured to identify and encapsulate identification information of the D2D terminal equipment, but there are no limits made in the embodiment of the disclosure.

Specifically, in FIG. 2a, the user-plane protocol stack of each of the D2D terminal equipment and the network equipment may include layer 1 (i.e., a PHY layer), layer 2 and a higher layer. Here, layer 2 includes a MAC layer, an RLC layer and a PDCP layer. The user-plane protocol stack of the relay terminal equipment may only include layer 1 and layer 2. Here, layer 2 may only include a MAC layer, or only include the MAC layer and an RLC layer or include the MAC layer, the RLC layer and a PDCP layer. In such case, data relay transmission among the D2D terminal equipment, the relay terminal equipment and the network equipment may be implemented by identifying the identification information of the D2D terminal equipment. Here, identification of the identification information of the D2D terminal equipment may be implemented in layer 2, but there are no limits made in the embodiment of the disclosure.

As another optional embodiment, in FIG. 2b, layers 2 of the D2D terminal equipment and the network equipment are equivalently added with ADP layers. In such case, the protocol stack of the D2D terminal equipment may include the PDCP layer, the RLC layer, the ADP layer and a lower layer corresponding to the D2D communication technology adopted for the PC5 interface. Here, if the D2D communication technology is the SL technology of LTE, the lower layer may specifically be the MAC layer and the PHY layer. if the D2D communication technology is another communication technology, for example, the Bluetooth or WIFI technology. The lower layer may be a layer corresponding to the MAC layer and the PHY layer in the other communication technology. The relay protocol stack of the relay terminal equipment may include layer 1 and layer 2 corresponding to the D2D communication technology. The relay protocol stack of the network equipment may include the PDCP layer, the RLC layer, the ADP layer, the MAC layer and the PHY layer. For convenient understanding, descriptions will be made in the following embodiments with the MAC layer and the PHY layer as an example, but the embodiment of the disclosure is not limited thereto.

Optionally, the ADP layer may be located between the MAC layer and the RLC layer and may also be located between the RLC layer and the PDCP layer, which is not limited in the embodiment of the disclosure. In the embodiment of the disclosure, the ADP layer may be configured to identify the identification information of the D2D terminal equipment or optionally may further be configured to identify a relay-specific LCID configured to indicate relay transmission. In addition, the ADP layer may optionally be configured to convert data received from the lower layer and transmitted by adopting various D2D communication technologies into a communication technology unrelated form, and optionally transmits the processed data to the upper layer for further processing. Optionally, the ADP layer may contain a layer-2 identifier of the D2D terminal equipment, or further contains a relay-specific LCID. Here, the relay-specific LCID may be configured to identify the relay data. In such case, a layer-2 PDU sent to the network equipment by the relay terminal equipment through the Uu interface may optionally not contain any information of the D2D terminal equipment and the relay data is identified with the relay-specific LCID. However, the embodiment of the disclosure is not limited thereto.

Figure 3:
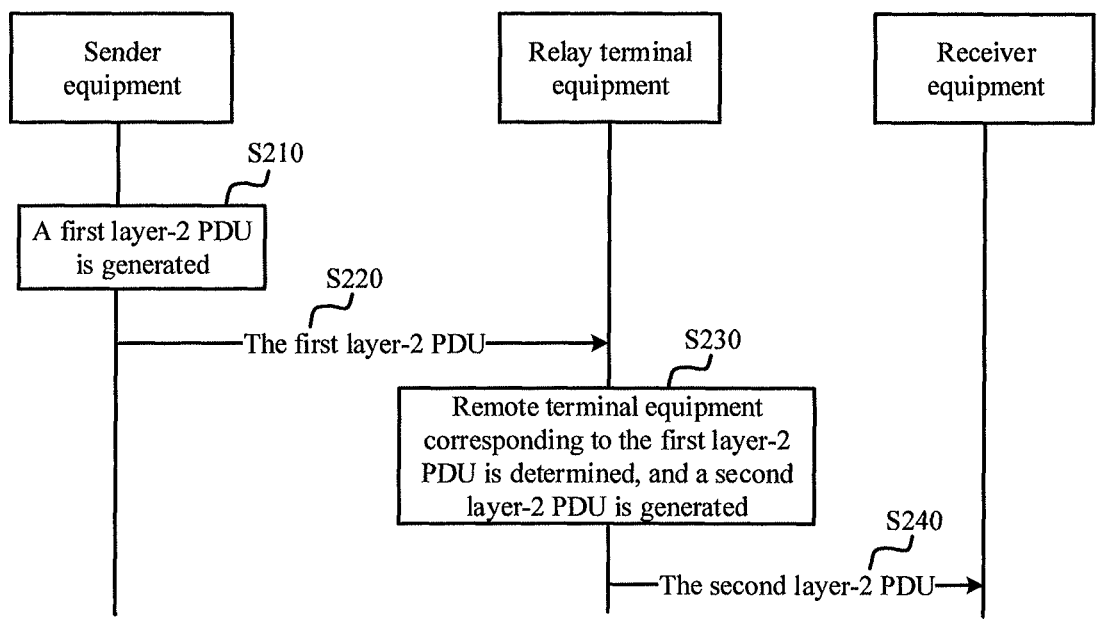
FIG. 3 is a schematic flowchart of a relay transmission method according to an embodiment of the disclosure.

FIG. 3 schematically shows a relay transmission method 200 according to an embodiment of the disclosure. The method 200 may be applied to the abovementioned wireless communication system 100, but the embodiment of the disclosure is not limited thereto. Specifically, the method 200 may be applied to relay transmission of uplink data. That is, remote terminal equipment transmits the uplink data to network equipment through relay terminal equipment. In such case, sender equipment is specifically the remote terminal equipment (which may also be called as D2D terminal equipment) and receiver equipment is specifically the network equipment. Optionally, the method 200 may also be applied to relay transmission of downlink data, that is, the network equipment transmits the downlink data to the remote terminal equipment through the relay terminal equipment. In such case, the sender equipment is the network equipment and the receiver equipment is the remote terminal equipment. However, there are no limits made in the embodiment of the disclosure.

In S210, the sender equipment performs encapsulation processing on data to be sent or information to be sent to generate a first layer-2 PDU.

It is to be understood that, in the embodiment of the disclosure, the layer-2 PDU may refer to that an outermost layer or highest layer of the data is encapsulated in layer 2 of the equipment. Optionally, layer 2 may include a MAC layer, an RLC layer and a PDCP layer, and correspondingly, the layer-2 PDU may specifically refer to a MAC PDU, an RLC PDU or a PDCP PDU. Optionally, if layer 2 of each of the remote terminal equipment and the network equipment further includes an ADP layer, a specific form of the layer-2 PDU transmitted at a PC5 interface may correspond to a D2D communication technology adopted for the PC5 interface. For example, if the D2D communication technology is an SL technology of LTE, the layer-2 PDU transmitted at the PC5 interface may specifically be a MAC PDU, and if the D2D communication technology is a Bluetooth or WIFI technology, the layer-2 PDU transmitted at the PC5 interface may specifically be a layer-2 PDU corresponding to the MAC PDU in the Bluetooth or WIFI technology. There are no limits made in the embodiment of the disclosure.

Optionally, the first layer-2 PDU may contain identification information of the remote terminal equipment, the identification information of the remote terminal equipment is configured to identify the remote terminal equipment, and the identification information of the remote terminal equipment may be identified by the relay terminal equipment. For example, the relay terminal equipment may identify the identification information of the remote terminal equipment through layer 2. However, the embodiment of the disclosure is not limited thereto. Optionally, the identification information of the remote terminal equipment may include a terminal equipment identifier of the remote terminal equipment, and the terminal equipment identifier may be configured to uniquely identify the remote terminal equipment. Here, the terminal equipment identifier may be predefined. For example, the terminal equipment identifier may specifically be an equipment identifier of the remote terminal equipment, a user identifier of the remote terminal equipment or the like. Optionally, the identification information of the remote terminal equipment may further include a specific identifier of the remote terminal equipment, and the specific identifier of the remote terminal equipment is configured to uniquely identify the remote terminal equipment during relay transmission. The specific identifier may be predefined and may also be configured by the network equipment. A length of the specific identifier may be smaller than a length of the terminal equipment identifier, so that a signaling overhead is reduced. For example, the specific identifier may be a layer-2 identifier, i.e., an identifier encapsulated and parsed in layer 2 of the equipment. Here, the layer-2 identifier may be predefined or allocated to the remote terminal equipment by the network equipment. For example, the layer-2 identifier is allocated to the remote terminal equipment by the network equipment in a process of establishing a bearer for the remote terminal equipment. However, the embodiment of the disclosure is not limited thereto. Optionally, the layer-2 identifier may be set in the PDCP layer, the RLC layer or the MAC layer, and is namely encapsulated and parsed in the PDCP layer, the RLC layer or the MAC layer. Optionally, if layer 2 of each of the remote terminal equipment and the network equipment further includes an independent ADP layer, the layer-2 identifier may be set in the ADP layer or a corresponding layer of the D2D communication technology. For example, if the SL technology is adopted for the PC5 interface between the relay terminal equipment and the remote terminal equipment, the layer-2 identifier may be set in the MAC layer. However, there are no limits made in the embodiment of the disclosure.

If each of the remote terminal equipment and the network equipment has the independent ADP layer and the ADP encapsulates and parses the identification information of the remote terminal equipment, when the remote terminal equipment or the network equipment has data to be sent, the data may be sequentially encapsulated through the PDCP layer, the RLC layer and the ADP layer. Here, the identification information (for example, the layer-2 identifier) of the remote terminal equipment may be contained in the ADP layer, but the embodiment of the disclosure is not limited thereto. Optionally, if the remote terminal equipment and the network equipment have no independent ADP layer and the identification information of the remote terminal equipment is parsed and encapsulated in the MC layer, when the remote terminal equipment or the network equipment has data to be sent, for example, the network equipment receives data of the remote terminal equipment on a network side, the data may be sequentially encapsulated through the PDCP layer, the RLC layer and the MAC layer. Here, the identification information (for example, the layer-2 identifier) of the remote terminal equipment may be contained in the MAC layer, but the embodiment of the disclosure is not limited thereto.

In S220, the sender equipment sends the first layer-2 PDU to the relay terminal equipment.

Optionally, the first layer-2 PDU may include an LCID field or a bearer identifier field, and the LCID field or the bearer identifier field may be set to enable the relay terminal equipment to determine that the data or information contained in the first layer-2 PDU is required to be forwarded, namely determining that the data contained in a second layer-2 PDU is relay data. For example, the bearer identifier field may be configured to contain a bearer identifier corresponding to the remote terminal equipment, and the LCID field may be configured to contain a relay-specific LCID to indicate that the data contained in the first layer-2 PDU is the relay data and is required to be forwarded by the relay terminal equipment. Here, the relay-specific LCID may be preconfigured and may also be allocated by the network equipment. For example, the network equipment allocates the relay-specific LCID in the process of establishing the bearer for the remote terminal equipment. However, the embodiment of the disclosure is not limited thereto.

Optionally, if the sender equipment is the remote terminal equipment or the receiver equipment is the network equipment, the remote terminal equipment may send the first layer-2 PDU to the relay terminal equipment through a transmission resource configured for relay transmission. In such case, the relay terminal equipment may determine that the data contained in the first layer-2 PDU is required to be forwarded according to the transmission resource occupied by the first layer-2 PDU. However, the embodiment of the disclosure is not limited thereto.

Optionally, the relay terminal equipment may further determine that the data contained in the first layer-2 PDU is the relay data in another manner, which is not limited in the embodiment of the disclosure.

Optionally, the relay terminal equipment may forward the data contained in the first layer-2 PDU to the receiver equipment according to the identification information or RNTI of the remote terminal equipment. Specifically, the receiving terminal equipment may perform encapsulation processing on the data contained in the first layer-2 PDU, for example, performing encapsulation processing on the data contained in the first layer-2 PDU in layer 2, to obtain the second layer-2 PDU and send the second layer-2 PDU to the receiver equipment. However, the embodiment of the disclosure is not limited thereto.

In S230, the relay terminal equipment receives the first layer-2 PDU sent by the sender equipment, determines the remote terminal equipment corresponding to the first layer-2 PDU and performs encapsulation processing on the data contained in the first layer-2 PDU to generate a second layer-2 PDU.

Optionally, the relay terminal equipment may determine the remote terminal equipment corresponding to the first layer-2 PDU according to the identification information, contained in the first layer-2 PDU, of the remote terminal equipment. For example, the relay terminal equipment may identify the identification information contained in the first layer-2 PDU in layer 2 to determine the remote terminal equipment corresponding to the first layer-2 PDU. Alternatively, when the sender equipment is the network equipment, the data contained in the first layer-2 PDU is optionally scheduled through a PDCCH. Here, the PDCCH is scrambled by adopting an RNTI of the remote terminal equipment. In such case, the relay terminal equipment may determine the remote terminal equipment corresponding to the first layer-2 PDU according to the RNTI adopted for the PDCCH configured to schedule the first layer-2 PDU. However, the embodiment of the disclosure is not limited thereto.

Optionally, the RNTI of the remote terminal equipment may be predefined or allocated to the remote terminal equipment by the network equipment. For example, the network equipment allocates the RNTI to the remote terminal equipment in the process of establishing the bearer for the remote terminal equipment. In such case, the relay terminal equipment may determine the remote terminal equipment corresponding to the first layer-2 PDU according to the RNTI adopted for the PDCCH configured to schedule the first layer-2 PDU. However, the embodiment of the disclosure is not limited thereto.

Optionally, the relay terminal equipment may perform encapsulation processing on the data contained in the first layer-2 PDU to generate the second layer-2 PDU. For example, encapsulation processing is performed on the data contained in the first layer-2 PDU in layer 2 to generate the second layer-2 PDU. Here, the first layer-2 PDU may meet an interface communication protocol between the relay terminal equipment and the sender equipment, and the second layer-2 PDU may meet an interface communication protocol between the relay terminal equipment and the receiver equipment.

Specifically, if the remote terminal equipment and the network equipment include no independent ADP layer, the relay terminal equipment may sequentially perform decapsulation and encapsulation processing on the first layer-2 PDU to convert a MAC PDU of a first interface into a MAC PDU of a second interface. Here, the first interface is a communication interface between the relay terminal equipment and the sender equipment, and the second interface is a communication interface between the relay terminal equipment and the receiver equipment. For example, when the sender equipment is the remote terminal equipment and the receiver equipment is the network equipment, the first interface is a PC5 interface and the second interface is a Uu interface. When the sender equipment is the network equipment and the receiver equipment is the remote terminal equipment, the first interface is a Uu interface and the second interface is a PC5 interface. For example, when the sender equipment is the network equipment, when the relay terminal equipment determines that the data contained in the first layer-2 PDU is the relay data, encapsulation processing may be performed on the data according to the communication technology for the PC5 interface to obtain a second layer-2 PDU meeting a PC5 interface protocol for sending through a PC5-User Plane (PC5-U). For another example, when the sender equipment is the remote terminal equipment, when the relay terminal equipment determines that the data contained in the first layer-2 PDU is the relay data, encapsulation processing is performed on the data according to a communication technology for the Uu interface to obtain a second layer-2 PDU (for example, an LTE Uu MAC PDU) meeting a Uu interface protocol.

Optionally, the second layer-2 PDU may contain the identification information of the remote terminal equipment, for example, the terminal equipment identifier or the layer-2 identifier.

Specifically, when the sender equipment is the remote terminal equipment and the receiver equipment is the network equipment, the first layer-2 PDU may optionally contain the terminal equipment identifier of the remote terminal equipment. In such case, the relay terminal equipment may determine the layer-2 identifier corresponding to the terminal equipment identifier, and the layer-2 identifier is contained in the second layer-2 PDU. The network equipment may determine the remote terminal equipment corresponding to the second layer-2 PDU according to the layer-2 identifier, contained in the second layer-2 PDU, of the remote terminal equipment and send the data contained in the second layer-2 PDU to core network equipment (for example, a P-GW).

Optionally, before the relay terminal equipment sends the second layer-2 PDU to the network equipment, the relay terminal equipment may further initiate an uplink grant request flow and adopt an uplink transmission resource allocated by the network equipment to send the second layer-2 PDU to the network equipment. Here, as an optional embodiment, the relay terminal equipment may operate according to an uplink grant request flow initiated when the relay terminal equipment is required to send uplink data to the network equipment. For example, the relay terminal equipment sends a scheduling request to the network equipment. The scheduling request is configured to request the network equipment to allocate the uplink transmission resource to the relay terminal equipment. The network equipment may allocate the uplink transmission resource to the relay terminal equipment according to the scheduling request and send an uplink grant to the relay terminal equipment. The uplink grant is configured to indicate the transmission resource allocated to the relay terminal equipment by the network equipment. The relay terminal equipment may adopt the uplink transmission resource to send the second layer-2 PDU to the network equipment.

As another optional embodiment, the relay terminal equipment may determine a preamble allocated to the remote terminal equipment by the network equipment and send the preamble to the network equipment to initiate the uplink grant request flow. In such case, the network equipment may determine the remote terminal equipment corresponding to the allocated uplink transmission resource according to the received preamble and, after receiving the second layer-2 PDU, determine the remote terminal equipment according to the uplink transmission resource occupied by the second layer-2 PDU. In such case, the second layer-2 PDU may not contain the identification information of the remote terminal equipment, so that the signaling overhead may further be reduced.

As another optional embodiment, the relay terminal equipment may send a BSR to the network equipment. Here, the BSR contains the identification information of the remote terminal equipment, for example, the layer-2 identifier or the terminal equipment identifier. After receiving the BSR, the network equipment may identify the identification information of the remote terminal equipment and send the PDCCH to the relay terminal equipment to schedule uplink data transmission of the remote terminal equipment. Here, the PDCCH contains the identification information of the remote terminal equipment. After receiving the PDCCH, the relay terminal equipment may send the second layer-2 PDU to the network equipment according to the PDCCH. The network equipment may determine the terminal equipment corresponding to the second layer-2 PDU according to the PDCCH configured to schedule the second layer-2 PDU. In such case, the second layer-2 PDU sent by the relay terminal may optionally not contain the identification information of the remote terminal equipment. However, the embodiment of the disclosure is not limited thereto.

When the sender equipment is the network equipment and the receiver equipment is the remote terminal equipment, the first layer-2 PDU may optionally contain the layer-2 identifier of the remote terminal equipment. In such case, the relay terminal equipment may determine the terminal equipment identifier corresponding to the layer-2 identifier and contain the terminal equipment identifier in the second layer-2 PDU. After receiving the second layer-2 PDU, the remote terminal equipment may determine whether the second layer-2 PDU is sent to it or not according to the terminal equipment identifier contained in the second layer-2 PDU. In such case, during data relay transmission between the remote terminal equipment and the relay terminal equipment, the remote terminal equipment may be identified through the terminal equipment identifier of the remote terminal equipment, and during data relay transmission between the relay terminal equipment and the network equipment, the remote terminal equipment may be identified through the layer-2 identifier of the remote terminal equipment. Therefore, the remote terminal equipment may not know about its own layer-2 identifier. However, the embodiment of the disclosure is not limited thereto.

Optionally, the second layer-2 PDU may further contain indication information configured to indicate that the data contained in the second layer-2 PDU is the relay data. For example, if the network equipment includes the ADP layer, the indication information may include the relay-specific LCID. In such case, the network equipment may determine that the received second layer-2 PDU is relayed through the relay terminal equipment according to the indication information. However, the embodiment of the disclosure is not limited thereto.

Optionally, the second layer-2 PDU may further contain identification information of the relay terminal equipment, for example, a terminal equipment identifier, but the embodiment of the disclosure is not limited thereto.

In S240, the relay terminal equipment sends the second layer-2 PDU to the receiver equipment.

The relay terminal equipment may forward the data contained in the first layer-2 PDU to the receiver equipment according to the remote terminal equipment corresponding to the first layer-2 PDU. For example, the second layer-2 PDU sent to the receiver equipment by the relay terminal equipment contains the identification information of the remote terminal equipment, or the second layer-2 PDU is sent by adopting the uplink transmission resource allocated to the remote terminal equipment by the network equipment. However, the embodiment of the disclosure is not limited thereto.

Optionally, when the receiver equipment is the remote terminal equipment, the relay terminal equipment may adopt the transmission resource configured for relay transmission to send the second layer-2 PDU to the remote terminal equipment, and the remote terminal equipment may determine that the second layer-2 PDU contains the relay data and is forwarded by the relay terminal equipment according to the transmission resource occupied by the second layer-2 PDU. However, the embodiment of the disclosure is not limited thereto.

After receiving the second layer-2 PDU, the receiver equipment may parse the second layer-2 PDU. For example, if the receiver equipment is the network equipment and the second layer-2 PDU contains the relay-specific LCID, the network equipment may determine that the data contained in the second layer-2 PDU is the relay data through the relay-specific LCID contained in the second layer-2 PDU. Optionally, the network equipment may transmit the data contained in the second layer-2 PDU to a core network through an S1-U interface. Optionally, the network equipment may further determine the remote terminal equipment corresponding to the second layer-2 PDU according to the identification information, contained in the second layer-2 PDU, of the remote terminal equipment. In such case, if a data transmission channel of the remote terminal equipment, for example, a General Packet Radio Service (GPRS) Tunneling Protocol (GTP) tunnel, has been established between the network equipment and the core network equipment (for example, the P-GW), the network equipment may send the data contained in the second layer-2 PDU to the core network equipment through the GTP tunnel corresponding to the remote terminal equipment. However, the embodiment of the disclosure is not limited thereto.

For another example, if the receiver equipment is the remote terminal equipment and the second layer-2 PDU is sent through the transmission resource configured for relay transmission, the remote terminal equipment may determine that the data contained in the second layer-2 PDU is relayed and forwarded by the relay terminal equipment according to the transmission resource occupied by the second layer-2 PDU. In addition, the remote terminal equipment may optionally determine whether the second layer-2 PDU is sent to it or not by identifying the identification information, contained in the second layer-2 PDU, of the remote terminal equipment. Optionally, if determining that the second layer-2 PDU is sent to it, the remote terminal equipment may further perform decoding processing on the second layer-2 PDU to obtain the data contained in the second layer-2 PDU. If determining that the second layer-2 PDU is not sent to it, the remote terminal equipment may discard the second layer-2 PDU. However, the embodiment of the disclosure is not limited thereto.

Figure 4:
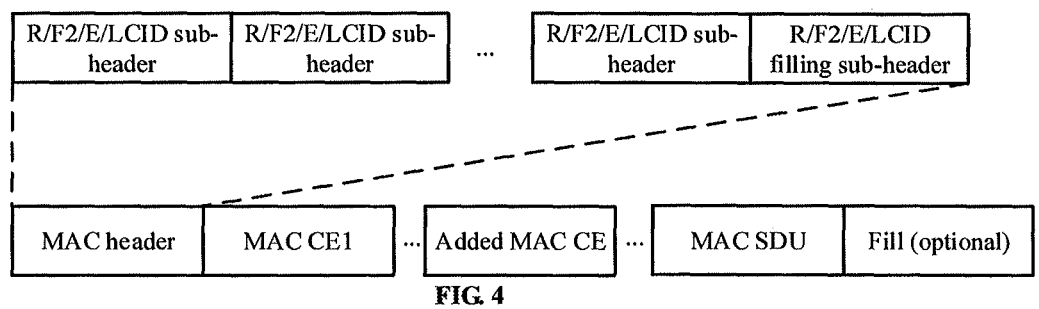
FIG. 4 is a schematic diagram of an example of a MAC PDU structure in a relay transmission method according to an embodiment of the disclosure.

In the embodiment of the disclosure, the relay terminal equipment relays the data between the remote terminal equipment and the network equipment in the layer-2 relay manner. For example, the relay terminal equipment performs relaying in a MAC relay manner. In such case, the relay terminal equipment may perform data transmission with the remote terminal equipment and the network equipment in a MAC PDU manner. Optionally, the MAC PDU may contain the identification information of the remote terminal equipment, for example, the layer-2 identifier or terminal equipment identifier of the remote terminal equipment. In such case, the identification information of the remote terminal equipment may be born in a MAC CE of the MAC PDU, and the MAC CE may be an existing MAC CE or an additional MAC CE, for example, as illustrated in FIG. 4. However, the embodiment of the disclosure is not limited thereto.

TABLE 1

Corresponding Relationship between Layer-2 Identifier of Remote Terminal Equipment and MAC CE

| Bit | Layer-2 identifier |
|---|---|
| 00000000 | Identifier 1 |
| ... | ... |
| 11111111 | Identifier X |

Optionally, before relay transmission, the network equipment may further establish an EPS bearer for the remote terminal equipment. Here, the EPS bearer may include a data transmission channel (for example, a GTP tunnel) between the network equipment and the P-GW and a radio bearer established by the network equipment. Here, the radio bearer may include a cellular data transmission channel between the network equipment and the relay terminal equipment and a D2D data transmission channel between the relay terminal equipment and the remote terminal equipment. However, the embodiment of the disclosure is not limited thereto.

Optionally, the relay terminal equipment may receive a connection establishment request of the remote terminal equipment. The connection establishment request is configured to request for establishment of a D2D communication link between the relay terminal equipment and the remote terminal equipment. Optionally, the connection establishment request may specifically be a direct communication request configured to request for establishment of a PC5 connection with the relay terminal equipment.

The relay terminal equipment may send a bearer establishment request to the core network equipment in response to the connection establishment request, and the bearer establishment request may contain the terminal equipment identifier of the remote terminal equipment. Optionally, the core network equipment may be an MME, and the MME may send the terminal equipment identifier, contained in the bearer establishment request, of the remote terminal equipment to the P-GW to enable the P-GW to establish the data transmission channel (for example, the GTP tunnel) of the remote terminal equipment with the network equipment and enable the network equipment to establish the radio bearer of the remote terminal equipment.

The relay terminal equipment may receive a bearer establishment response sent by the network equipment, the bearer establishment response containing configuration information of the EPS bearer established for the remote terminal equipment by the network equipment. Here, the configuration information of the EPS bearer may optionally include configuration information of the radio bearer. The configuration information of the radio bearer may include layer-2 configuration information (for example, MAC-layer configuration information) and PHY-layer configuration information. Optionally, the configuration information of the EPS bearer may further include configuration information of user-plane equivalent layers of the remote terminal equipment and the network equipment, for example, PDCP-layer configuration information and/or RLC-layer configuration information. Optionally, the MAC-layer configuration information may include the layer-2 identifier and/or relay-specific LCID allocated to the remote terminal equipment by the network equipment, and the PHY-layer configuration information may include at least one of: information of the transmission resource configured for relay transmission, the preamble allocated to the remote terminal equipment and the RNTI allocated to the remote terminal equipment. However, the embodiment of the disclosure is not limited thereto.

Optionally, the relay terminal equipment may send a connection establishment response to the remote terminal equipment according to the bearer establishment response. Optionally, the connection establishment response contains the PHY-layer configuration information and configuration information configured for relay transmission between the relay terminal equipment and the remote terminal equipment in the MAC-layer configuration information, for example, the layer-2 identifier and/or the information of the transmission resource, or may further contain the PDCP-layer configuration information and/or the RLC-layer configuration information. Optionally, if the connection establishment response does not contain the PDCP-layer configuration information and/or the RLC-layer configuration information, the remote terminal equipment may configure the PDCP layer and/or the RLC layer according to a received D2D broadcast message of the relay terminal equipment. Optionally, if the connection establishment response contains the PDCP-layer configuration information and/or the RLC-layer configuration information, the remote terminal equipment may configure layer 2 according to at least one of the RLC-layer configuration information and/or PDCP-layer configuration information contained in the connection establishment response. However, the embodiment of the disclosure is not limited thereto.

Therefore, according to the relay transmission method of the embodiment of the disclosure, the relay terminal equipment relays the data between the remote terminal equipment and the network equipment in the layer-2 relay manner. Here, the layer-2 PDU sent to the relay terminal equipment by the remote terminal equipment or the network equipment contains the identification information of the remote terminal equipment, or the network equipment scrambles the PDCCH configured to schedule the layer-2 PDU through the RNTI of the remote terminal equipment, and the relay terminal equipment may determine the remote terminal equipment corresponding to the layer-2 PDU according to the identification information or RNTI of the remote terminal equipment and forward the data contained in the layer-2 PDU. Compared with a layer-3 relay manner adopted by the relay terminal equipment in the conventional art, such a manner may reduce processing complexity of the relay terminal equipment, reduce a transmission delay of the relay data and improve overall system performance.

The embodiment of the disclosure will be described below in combination with specific examples in detail. It is important to note that these examples are adopted not to limit the scope of the embodiment of the disclosure but only to help those skilled in the art to better understand the embodiment of the disclosure.

For convenient description, in the following examples, there is made such a hypothesis that a cellular network has established a Packet Data Network (PDN) connection and a bearer for remote terminal equipment and such a hypothesis that the remote terminal equipment is specifically remote UE, relay terminal equipment is specifically relay UE, network equipment is specifically an eNB and a layer-2 PDU of a PC5 interface and a layer-2 PDU of a Uu interface are both MAC PDUs. It is to be understood that, if layer 2 of the remote terminal equipment includes an ADP layer and the PC5 interface adopts another D2D communication technology different from an SL technology of LTE, the PDU of the PC5 interface may be a PDU of layer 2 corresponding to the other D2D communication technology. However, the embodiment of the disclosure is not limited thereto.

Figure 5:
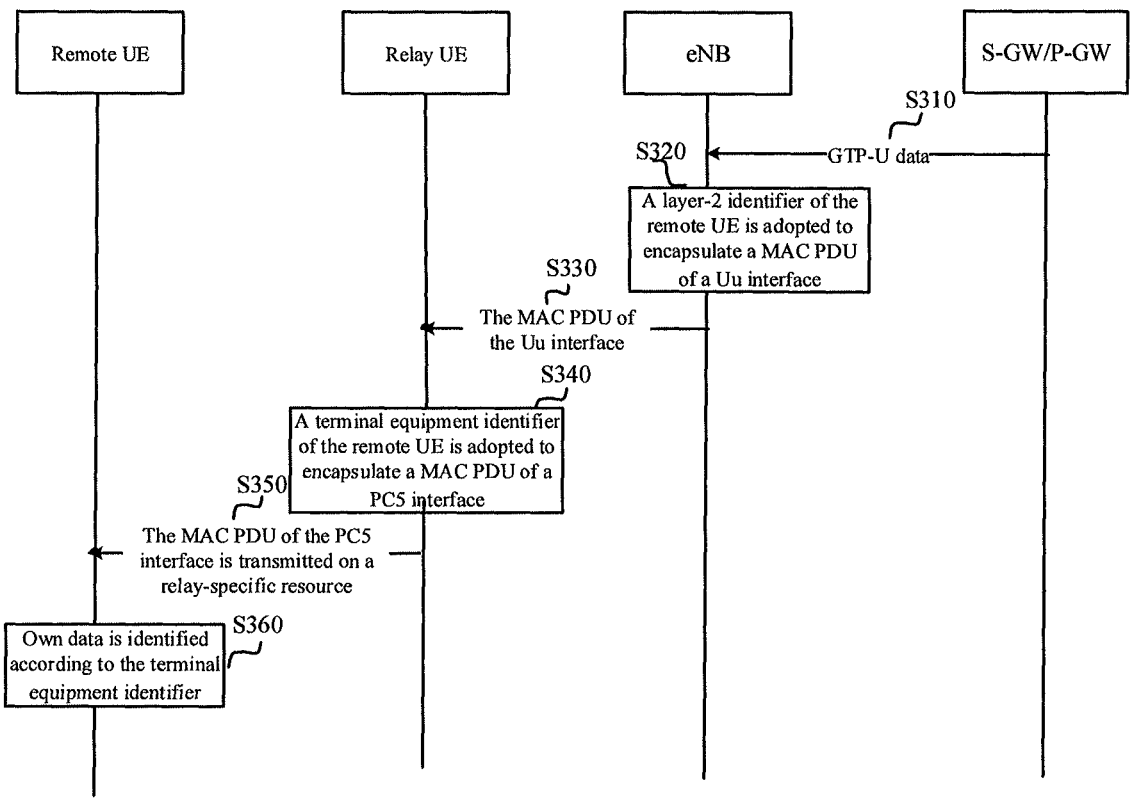
FIG. 5 is a schematic flowchart of another relay transmission method according to an embodiment of the disclosure.

FIG. 5 schematically shows a relay transmission method 300 according to another embodiment of the disclosure. The method 300 may be applied to relay transmission of downlink data. In a relay transmission process of the method 300, a layer-2 identifier of a remote terminal equipment is adopted to identify the remote terminal equipment.

In S310, when receiving data sent by the remote terminal equipment, a P-GW sends the data to an eNB through a GTP-U of an S1-U interface allocated in a bearer establishment process.

In S320, after receiving the data of the remote terminal equipment from the GTP-U, the eNB encapsulates the data into a MAC PDU of a Uu interface. Here, a MAC CE in the MAC PDU of the Uu interface contains a layer-2 identifier or terminal equipment identifier of the remote terminal equipment.

In S330, the eNB may schedules downlink data transmission through a PDCCH addressed by a relay-specific RNTI and transmit the MAC PDU of the Uu interface to a relay terminal equipment in a Physical Downlink Shared Channel (PDSCH).

In such case, the eNB may optionally scramble the PDCCH through the relay-specific RNTI to indicate that the PDCCH is configured to schedule relay data transmission. Correspondingly, the relay terminal equipment may perform addressing according to the relay-specific RNTI. However, the embodiment of the disclosure is not limited thereto.

In S340, after receiving the MAC PDU of the Uu interface, the relay terminal equipment may parse the layer-2 identifier or terminal equipment identifier, contained in the MAC PDU, of the remote terminal equipment and perform encapsulation processing on the data to obtain a MAC PDU of a PC5 interface. Here, optionally, if the remote terminal equipment knows about its own layer-2 identifier, the MAC PDU of the PC5 interface may contain the layer-2 identifier of the remote terminal equipment. Alternatively, the relay terminal equipment may associate the layer-2 identifier of the remote equipment with the terminal equipment identifier of the remote terminal equipment, and the MAC PDU of the PC5 interface may contain the terminal equipment identifier of the remote terminal equipment. However, the embodiment of the disclosure is not limited thereto.

In S350, the relay terminal equipment sends the MAC PDU of the PC5 interface on a specific time-frequency resource configured for relay transmission.

In S360, after receiving the MAC PDU of the PC5 interface, the remote terminal equipment performs parsing processing on the MAC PDU, and if the MAC PDU contains the terminal equipment identifier or layer-2 identifier of the remote terminal equipment, submits the data to a higher layer for further processing, otherwise the remote terminal equipment discards the MAC PDU.

Figure 6:
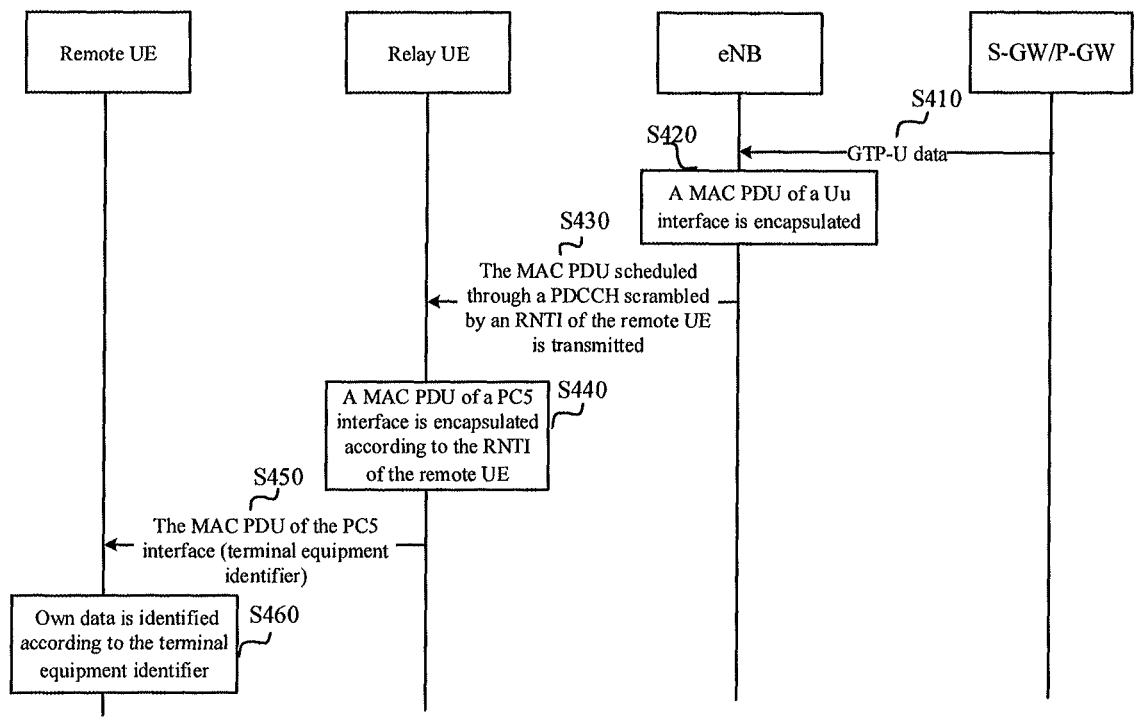
FIG. 6 is a schematic flowchart of another relay transmission method according to an embodiment of the disclosure.

FIG. 6 schematically shows a relay transmission method 400 according to another embodiment of the disclosure. The method 400 may be applied to relay transmission of downlink data. In a relay transmission process of the method 400, an RNTI of a remote terminal equipment is adopted to identify the remote terminal equipment.

S410 is the same as S310, and may specifically refer to descriptions in the abovementioned embodiment and will not be elaborated herein for simplicity.

In S420, after receiving data of the remote terminal equipment from a GTP-U, an eNB encapsulates the data into a MAC PDU of a Uu interface.

Optionally, the MAC PDU of the Uu interface may not contain identification information of remote UE.

In S430, the eNB may schedules downlink data transmission of relay terminal equipment through a PDCCH and transmit the MAC PDU of the Uu interface to the relay terminal equipment in a PDSCH. Here, the PDCCH is scrambled by adopting the RNTI of the remote terminal equipment.

In such case, the relay terminal equipment may perform addressing through the RNTI of the remote terminal equipment, but the embodiment of the disclosure is not limited thereto. The RNTI of the remote terminal equipment may be configured to identify the remote terminal equipment in the relay transmission process. The RNTI of the remote terminal equipment may be predefined, may also be allocated to the remote terminal equipment by network equipment, and for example, is allocated in a bearer establishment process. However, the embodiment of the disclosure is not limited thereto.

In S440, after receiving the MAC PDU of the Uu interface, the relay terminal equipment may determine the remote terminal equipment corresponding to the MAC PDU according to the RNTI adopted for the PDCCH configured to schedule the MAC PDU and encapsulate the data contained in the MAC PDU of the Uu interface into a MAC PDU of a PC5 interface. Here, the MAC PDU of the PC5 interface may contain a terminal equipment identifier or layer-2 identifier associated with the RNTI of the remote terminal equipment.

S450~S460 are the same as S350~S360, may specifically refer to descriptions in the abovementioned embodiment and will not be elaborated herein for simplicity.

Figure 7:
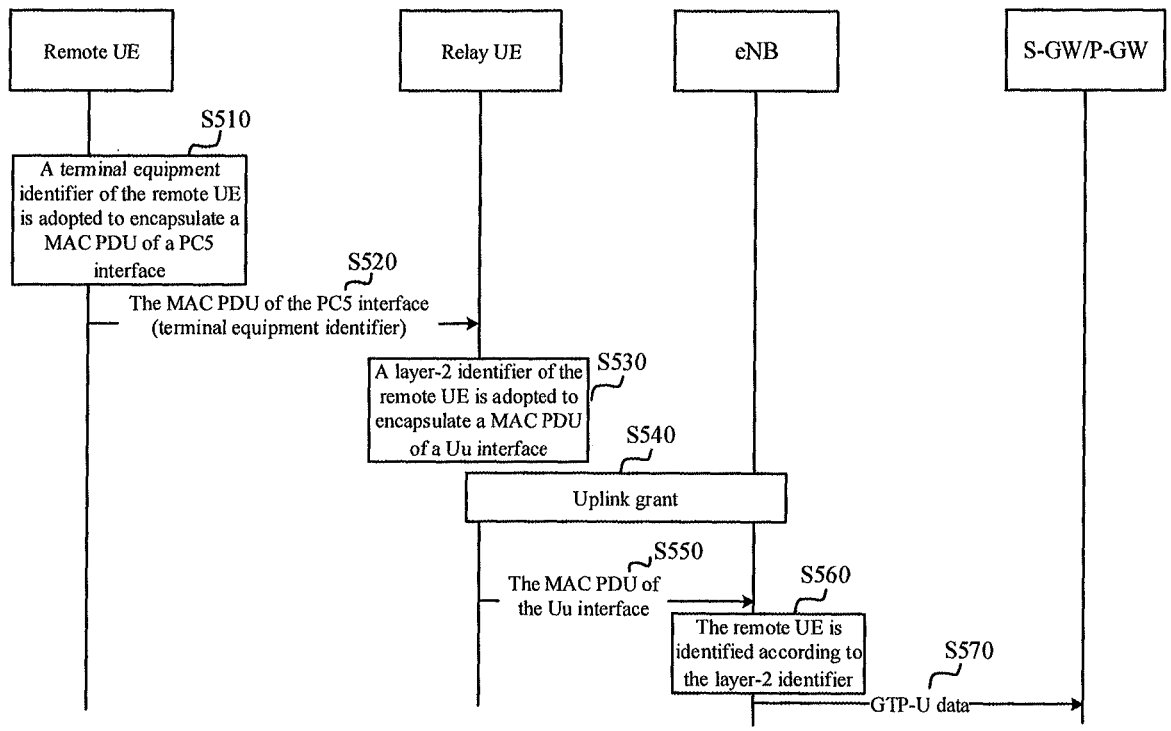
FIG. 7 is schematic flowchart of another relay transmission method according to an embodiment of the disclosure.

FIG. 7 schematically shows a relay transmission method 500 according to another embodiment of the disclosure. The method 500 may be applied to relay transmission of uplink data. In a relay transmission process of the method 500, a layer-2 identifier or terminal equipment identifier of a remote terminal equipment is adopted to identify the remote terminal equipment.

In S510, when the remote terminal equipment has data to be sent to a cellular network, the remote terminal equipment encapsulates the data into a MAC PDU. Here, the MAC PDU contains the terminal equipment identifier or layer-2 identifier of the remote terminal equipment.

In S520, the remote terminal equipment sends the MAC PDU on a time-frequency resource configured for relay transmission through a PC5 interface.

In S530, after receiving the MAC PDU from the remote terminal equipment, relay terminal equipment parses the MAC PDU of the PC5 interface and encapsulates a MAC PDU of a Uu interface according to the terminal equipment identifier or layer-2 identifier contained in the MAC PDU of the PC5 interface. Here, the MAC PDU of the Uu interface contains the layer-2 identifier or terminal equipment identifier allocated to the remote terminal equipment by network equipment.

Optionally, in S540, the relay terminal equipment may initiate an uplink grant request.

Optionally, the relay terminal equipment may initiate an uplink grant request flow through an existing flow, but the embodiment of the disclosure is not limited thereto.

In S550, the relay terminal equipment adopts an uplink transmission resource allocated by an eNB in an uplink grant process to send the MAC PDU of the Uu interface to the eNB.

In S560, the eNB parses the MAC PDU of the Uu interface to identify the layer-2 identifier or terminal equipment identifier of the remote terminal equipment.

In S570, the eNB transmits the data contained in the MAC PDU to a P-GW in a GTP-U corresponding to the layer-2 identifier or the terminal equipment identifier through an S1 interface.

Figure 8:
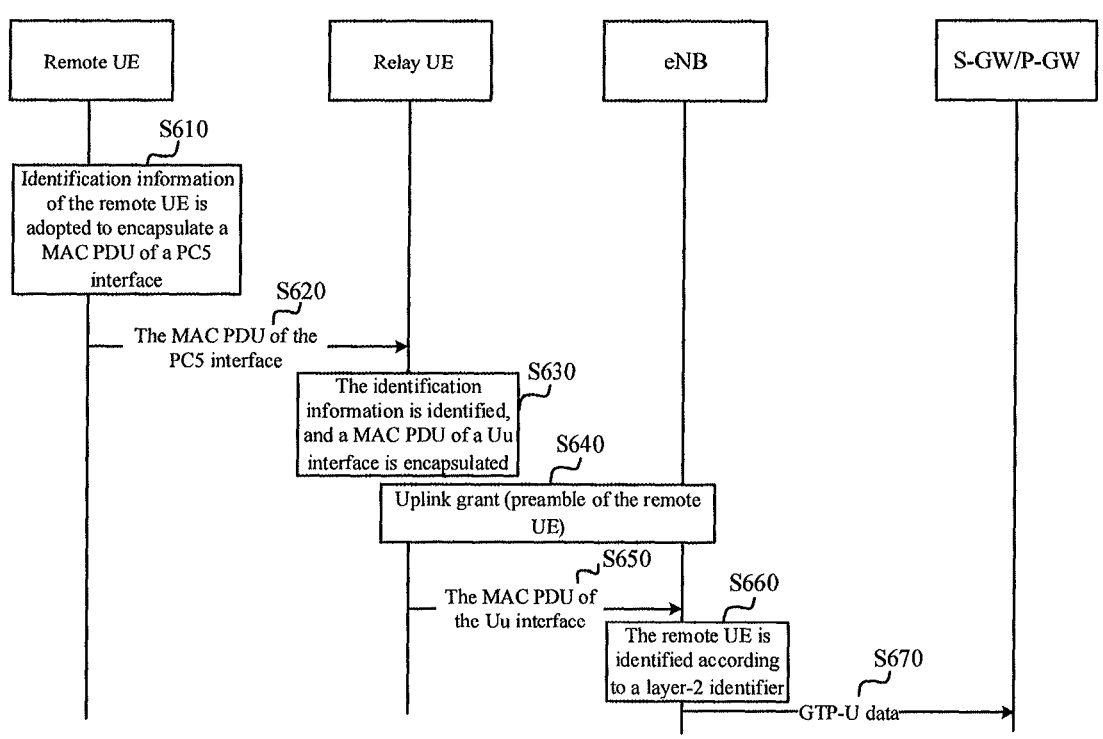
FIG. 8 is schematic flowchart of another relay transmission method according to an embodiment of the disclosure.

FIG. 8 schematically shows a relay transmission method 600 according to another embodiment of the disclosure. The method 600 may be applied to relay transmission of uplink data.

S610~S620 are the same as S510~S520, may specifically refer to descriptions in the abovementioned embodiment and will not be elaborated herein for simplicity.

In S630, after receiving a MAC PDU from remote terminal equipment, relay terminal equipment parses the received MAC PDU of a PC5 interface to determine the remote terminal equipment corresponding to the MAC PDU, and encapsulates the MAC PDU of the PC5 interface into a MAC PDU of a Uu interface.

In S640, the relay terminal equipment determines a preamble configured to the remote terminal equipment by network equipment according to a terminal equipment identifier or layer-2 identifier, contained in the MAC PDU of the PC5 interface, of the remote terminal equipment, and adopts the preamble to initiate an uplink grant request flow. After receiving the preamble of the relay terminal equipment, an eNB may allocate an, uplink transmission resource to data of the remote terminal equipment according to the preamble.

Optionally, the network equipment may allocate the preamble to the remote terminal equipment in a process of establishing a bearer for the remote terminal equipment. After receiving the preamble allocated by the network equipment, the relay terminal equipment may associate the preamble with identification information of the remote terminal equipment. However, the embodiment of the disclosure is not limited thereto.

In S650, the relay terminal equipment may adopt the uplink transmission resource allocated by the eNB in an uplink grant process to send the MAC PDU of the Uu interface to the eNB.

S660~S670 are the same as S560~S570, may specifically refer to descriptions in the abovementioned embodiment and will not be elaborated herein for simplicity.

In the embodiment, the relay terminal equipment adopts the preamble corresponding to the remote terminal equipment to request for an uplink grant. After receiving the preamble, the eNB may determine the remote terminal equipment corresponding to the preamble and allocate an uplink transmission resource to the relay terminal equipment. In such case, the eNB may associate the remote terminal equipment with the uplink transmission resource. Then, after receiving the MAC PDU of the Uu interface, the eNB may determine the remote terminal equipment corresponding to the MAC PDU of the Uu interface according to the uplink transmission resource. In such case, the MAC PDU of the Uu interface may not contain the identification information of the remote terminal equipment. Therefore, a signaling overhead is further reduced.

Figure 9:
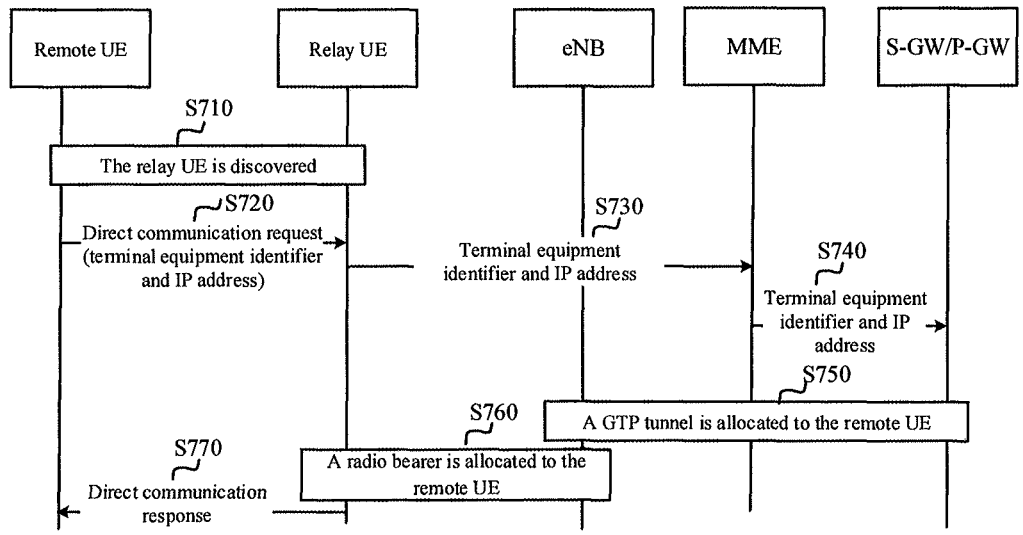
FIG. 9 is a schematic flowchart of a method for establishing a bearer of a remote terminal equipment according to an embodiment of the disclosure.

FIG. 9 schematically shows a bearer establishment method 700 according to an embodiment of the disclosure. In the method 700, there is made such a hypothesis that remote terminal equipment has been attached to a cellular network (for example, an Evolved Universal Terrestrial Radio Access Network (E-UTRAN)) or the remote terminal equipment has established a PDN connection with the cellular network. However, the embodiment of the disclosure is not limited thereto.

In S710, the remote terminal equipment discovers relay terminal equipment and resides.

In S720, the remote terminal equipment sends a direct communication request to the relay terminal equipment. Here, the direct communication request may contain a terminal equipment identifier of the remote terminal equipment and an IP address of the PDN connection of the remote terminal equipment.

The direct communication request may specifically be configured to establish a D2D communication link between the remote terminal equipment and the relay terminal equipment, for example, a PC5 connection between the remote terminal equipment and the relay terminal equipment. However, the embodiment of the disclosure is not limited thereto.

In S730, after receiving the direct communication request sent by the remote terminal equipment, the relay terminal equipment reports the terminal equipment identifier of the remote terminal equipment and the IP address of the PDN connection to an MME.

In S740, the MME may store the terminal equipment identifier and the IP address and transmit them to an S-GW/P-GW.

In S750, the MME and the S-GW allocate a GTP tunnel of an S1-U interface to the remote terminal equipment, for example, a Tunnel Endpoint Identifier (TEID).

In S760, the eNB allocates a radio bearer to the remote terminal equipment. Here, a layer-2 identifier and/or RNTI allocated to the remote terminal equipment may be included.

The radio bearer may include a cellular data transmission channel between access network equipment and the relay terminal equipment and a D2D data transmission channel between the relay terminal equipment and the remote terminal equipment. Optionally, configuration information of the radio bearer may include PHY-layer configuration information and MAC-layer configuration information. Optionally, the PHY-layer configuration information may include a preamble allocated to the remote terminal equipment. However, the embodiment of the disclosure is not limited thereto.

In S770, the relay terminal equipment sends a direct communication response to the remote terminal equipment.

Optionally, the direct communication response may contain a Radio Resource Control (RRC) container, and the RRC container may be encapsulated with an RLC-layer configuration and/or a PDCP-layer configuration. Correspondingly, after receiving the direct communication response, the remote terminal equipment may configure a corresponding RLC layer and/or PDCP layer according to an RRC configuration in the direct communication response. Optionally, the direct communication response may further contain the layer-2 identifier allocated to the remote terminal equipment by the network equipment. However, the embodiment of the disclosure is not limited thereto.

Figure 10:
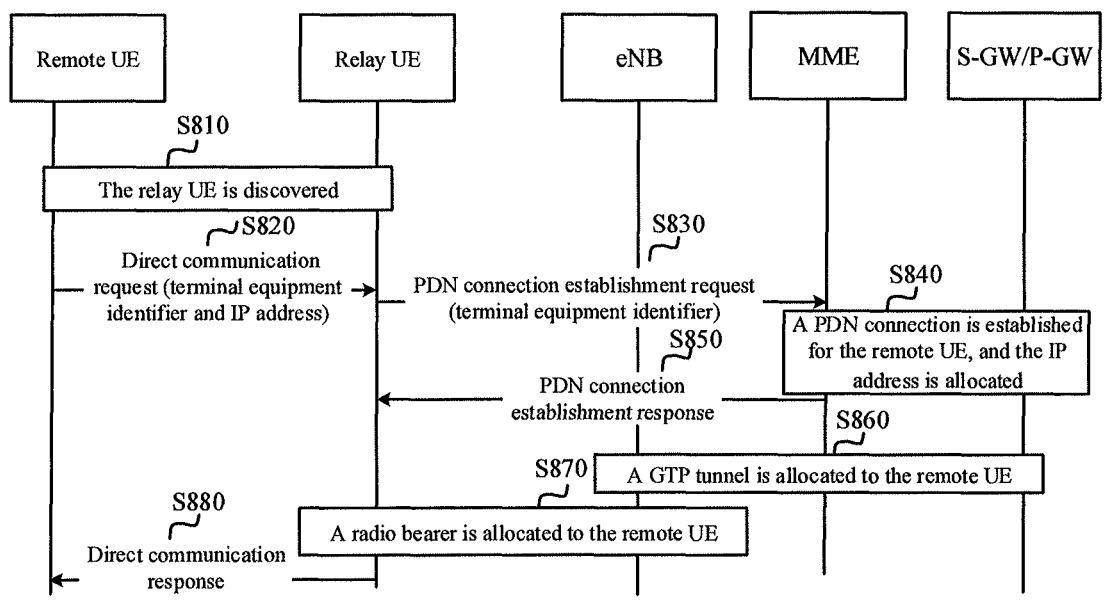
FIG. 10 is a schematic flowchart of another method for establishing a beater of a remote terminal equipment according to an embodiment of the disclosure.

FIG. 10 schematically shows another bearer establishment method 800 according to an embodiment of the disclosure. In the method 800, there is made such a hypothesis that remote terminal equipment has yet not established a default PDN connection.

In S810, the remote terminal equipment discovers relay terminal equipment and resides.

In S820, the remote terminal equipment sends a direct communication request to the relay terminal equipment. Here, the direct communication request may contain a terminal equipment identifier of the remote terminal equipment and indication information configured to request for establishment of the PDN connection.

In such case, the direct communication request may be configured to request for establishment of a PC5 connection between the remote terminal equipment and the relay terminal equipment, and may optionally be further configured to request for establishment of the PDN connection between the remote terminal equipment and a cellular network.

In S830, the relay terminal equipment may send a PDN connection establishment request to an MME according to the direct communication request to request for establishment of the PDN connection of the remote terminal equipment. Optionally, the PDN connection establishment request may contain the terminal equipment identifier of the remote terminal equipment.

In S840, core network equipment (the MME or an S-GW/P-GW) creates the PDN connection for the remote terminal equipment and allocates an IP address to the remote terminal equipment.

In S850, the MME sends a PDN connection establishment response to the relay terminal equipment, the PDN connection establishment response containing configuration information of the PDN connection, for example, the IP address.

In S860, the MME allocates an S1-U GTP tunnel to the remote terminal equipment, for example, a TEID.

In S870, an eNB allocates a radio bearer between the relay terminal equipment and the eNB to the remote terminal equipment. Here, at least one of the layer-2 identifier or RNTI allocated to the remote terminal equipment may be included.

In S880, the relay terminal equipment sends a direct communication response to the remote terminal equipment.

Optionally, the direct communication response may contain an RRC container, and the RRC container may be encapsulated with an RLC-layer configuration and/or a PDCP-layer configuration. Correspondingly, after receiving the direct communication response, the remote terminal equipment may configure a corresponding RLC layer and/or PDCP layer according to an RRC configuration in the direct communication response. Optionally, the direct communication response may further contain the layer-2 identifier allocated to the remote terminal equipment by the network equipment. However, the embodiment of the disclosure is not limited thereto.

It is important to note that the examples of FIG. 5 to FIG. 10 are adopted not to limit the scope of the embodiment of the disclosure but to help those skilled in the art to better understand the embodiment of the disclosure. Those skilled in the art may obviously make various equivalent modifications or variations according to the listed examples of FIG. 5 to FIG. 10, and these modifications and variations also fall within the scope of the embodiment of the disclosure.

It is to be understood that magnitudes of sequence numbers of each process do not mean an execution sequence and the execution sequence of each process should be determined by their functions and an internal logic and should not form any limit to an implementation process of the embodiment of the disclosure.

The relay transmission method according to the embodiment of the disclosure is described above in combination with FIG. 2 to FIG. 10 in detail, and a relay transmission device according to the embodiment of the disclosure will be described below in combination with FIG. 11 to FIG. 16 in detail.

Figure 11:
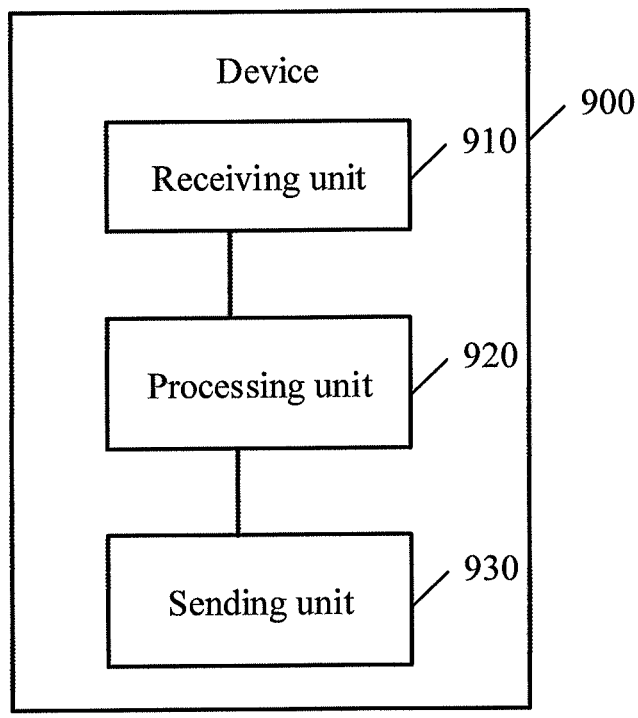
FIG. 11 is a schematic block diagram of a relay transmission device according to an embodiment of the disclosure.

FIG. 11 shows a relay transmission device 900 according to an embodiment of the disclosure. The device 900 includes a receiving unit 910, a processing unit 920 and a sending unit 930.

The receiving unit 910 is configured to receive a first layer-2 PDU which is intended to be sent from a sender equipment to a receiver equipment. Here, the first layer-2 PDU contains identification information of a remote terminal equipment, or the first layer-2 PDU is scheduled through a PDCCH scrambled by adopting an RNTI of the remote terminal equipment.

The processing unit 920 is configured to generate a second layer-2 PDU according to the first layer-2 PDU received by the receiving unit 910.

The sending unit 930 is configured to send the second layer-2 PDU generated by the processing unit 920 to the receiver equipment.

Here, the sender equipment is the remote terminal equipment and the receiver equipment is a network equipment, or the sender equipment is the network equipment and the receiver equipment is the remote terminal equipment.

Optionally, the identification information of the remote terminal equipment includes a terminal equipment identifier of the remote terminal equipment or a layer-2 identifier of the remote terminal equipment.

Optionally, when the sender equipment is the network equipment and the receiver equipment is the remote terminal equipment, the identification information of the remote terminal equipment includes the layer-2 identifier of the remote terminal equipment. In such case, the processing unit 920 is specifically configured to: determine the terminal equipment identifier corresponding to the layer-2 identifier and perform encapsulation processing on data contained in the first layer-2 PDU to generate the second layer-2 PDU. Here, the second layer-2 PDU contains the corresponding terminal equipment identifier.

Optionally, when the sender equipment is the remote terminal equipment and the receiver equipment is the network equipment, the processing unit 920 is further configured to, before generating the second layer-2 PDU according to the first layer-2 PDU, determine a preamble corresponding to the identification information of the remote terminal equipment.

The sending unit 930 is further configured to send the preamble determined by the processing unit 920 to the network equipment.

The receiving unit 910 is further configured to receive an uplink grant which is sent by the network equipment in response to the preamble, the uplink grant indicating an uplink transmission resource allocated by the network equipment.

The sending unit 930 is specifically configured to adopt the uplink transmission resource indicated by the uplink grant received by the receiving unit 910 to send the second layer-2 PDU to the network equipment.

Optionally, when the sender equipment is the remote terminal equipment and the receiver equipment is the network equipment, the sending unit 930 is further configured to, before sending the second layer-2 PDU to the receiver equipment, send a BSR to the network equipment. Here, the BSR contains the identification information of the remote terminal equipment.

The receiving unit 910 is further configured to receive the PDCCH which is sent by the network equipment according to the BSR, the PDCCH containing the identification information of the remote terminal equipment.

The sending unit 930 is specifically configured to send the second layer-2 PDU to the network equipment according to the PDCCH received by the receiving unit 910.

Optionally, when the sender equipment is the remote terminal equipment and the receiver equipment is the network equipment, the identification information of the remote terminal equipment includes the terminal equipment identifier of the remote terminal equipment. In such case, the processing unit 920 is specifically configured to: determine the layer-2 identifier corresponding to the terminal equipment identifier and perform encapsulation processing on the data contained in the first layer-2 PDU to generate the second layer-2 PDU. Here, the second layer-2 PDU contains the corresponding layer-2 identifier.

Optionally, when the sender equipment is the network equipment and the receiver equipment is the remote terminal equipment, the first layer-2 PDU contains a relay-specific LCID. In such case, the processing unit 920 is further configured to, before generating the second layer-2 PDU according to the first layer-2 PDU, determine that the data contained in the first layer-2 PDU is required to be forwarded according to the relay-specific LCID.

Optionally, when the sender equipment is the remote terminal equipment and the receiver equipment is the network equipment, the second layer-2 PDU contains the relay-specific LCID. The network equipment may determine that the data contained in the second layer-2 PDU is forwarded by the relay terminal equipment according to the relay-specific LCID.

Optionally, when the sender equipment is the remote terminal equipment and the receiver equipment is the network equipment, the first layer-2 PDU is sent by the remote terminal equipment by adopting a transmission resource configured for relay transmission. In such case, the processing unit 920 is further configured to, before generating the second layer-2 PDU according to the first layer-2 PDU, determine that the data contained in the first layer-2 PDU is required to be forwarded according to the transmission resource.

Optionally, when the sender equipment is the network equipment and the receiver equipment is the remote terminal equipment, the sending unit 930 may specifically be configured to send the second layer-2 PDU to the remote terminal equipment through the transmission resource configured for relay transmission. The remote terminal equipment may determine that the data contained in the second layer-2 PDU is forwarded by the relay terminal equipment according to the transmission resource occupied by the second layer-2 PDU.

Optionally, when the sender equipment is the network equipment and the receiver equipment is the remote terminal equipment, the first layer-2 PDU is scheduled by the network equipment through a PDCCH scrambled by a relay-specific RNTI. In such case, the processing unit 920 is further configured to, before generating the second layer-2 PDU according to the first layer-2 PDU, determine that the data contained in the first layer-2 PDU is required to be forwarded according to the relay-specific RNTI adopted for the PDCCH configured to schedule the first layer-2 PDU.

Optionally, the receiving unit 910 is further configured to, before receiving the first layer-2 PDU sent by the sender equipment, receive a connection establishment request of the remote terminal equipment. The connection establishment request is configured to request for establishment of a D2D communication link between the relay terminal equipment and the remote terminal equipment; the sending unit 930 is further configured to send a bearer establishment request to core network equipment in response to the connection establishment request, the bearer establishment request containing the terminal equipment identifier of the remote terminal equipment to enable the core network equipment to establish an EPS bearer of the remote terminal equipment with the network equipment; and the receiving unit 910 is further configured to receive a bearer establishment response sent by the network equipment, the bearer establishment response containing configuration information of the EPS bearer established for the remote terminal equipment by the network equipment. Here, the EPS bearer includes a cellular data transmission channel between the network equipment and the relay terminal equipment and a D2D data transmission channel between the relay terminal equipment and the remote terminal equipment.

Optionally, the configuration information of the EPS bearer includes MAC-layer configuration information and PHY-layer configuration information. In such case, the sending unit 930 is further configured to send a connection establishment response to the remote terminal equipment, the connection establishment response containing the PHY-layer configuration information and the MAC-layer configuration information.

In an optional example, the device 900 may specifically be the relay terminal equipment in the abovementioned embodiment, and the device 90Q may be configured to execute each flow and/or step corresponding to the relay terminal equipment in the abovementioned method embodiment and will not be elaborated herein to avoid repetitions.

Figure 12:
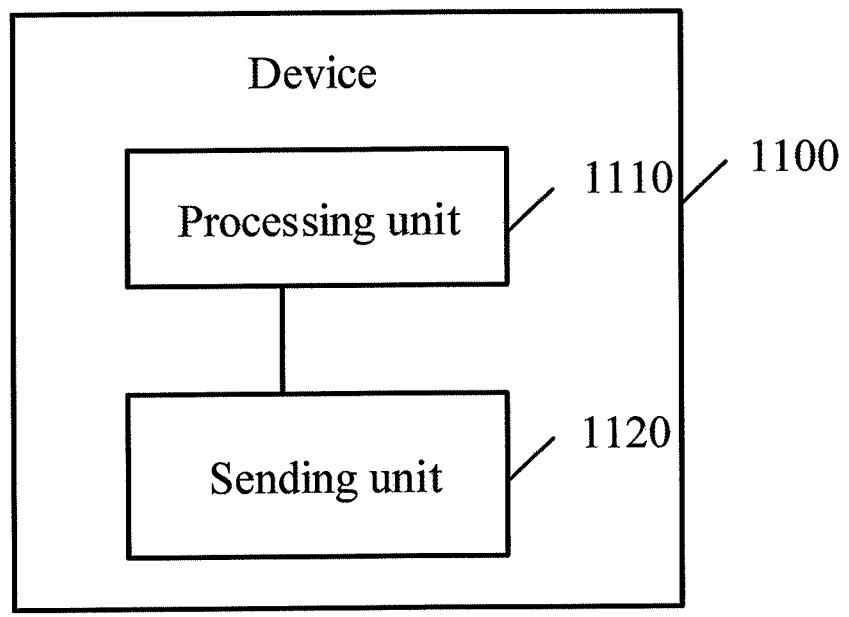
FIG. 12 is a schematic block diagram of another relay transmission device according to an embodiment of the disclosure.

FIG. 12 schematically shows another relay transmission device 1100 according to an embodiment of the disclosure. The device 1100 includes a processing unit 1110 and a sending unit 1120.

The processing unit 1110 is configured to perform encapsulation processing on data to be sent to a receiver equipment to generate a first layer-2 PDU. Here, the first layer-2 PDU contains identification information of a remote terminal equipment, or the first layer-2 PDU is scheduled through a PDCCH scrambled by adopting an RNTI of the remote terminal equipment.

The sending unit 1120 is configured to send the first layer-2 PDU generated by the processing unit 1110 to a relay terminal equipment.

Here, the device 1100 is the remote terminal equipment and the receiver equipment is a network equipment, or the device 1100 is the network equipment and the receiver equipment is the remote terminal equipment.

Optionally, the identification information of the remote terminal equipment includes a terminal equipment identifier of the remote terminal equipment or a layer-2 identifier of the remote terminal equipment.

Optionally, the first layer-2 PDU contains a relay-specific LCID, and the relay-specific LCID is configured for the relay terminal equipment to determine that the data contained in the first layer-2 PDU is required to be forwarded.

Optionally, if the device 1100 is the remote terminal equipment, the sending unit 1120 is specifically configured to adopt a transmission resource configured for relay transmission to send the first layer-2 PDU to the relay terminal equipment.

Optionally, if the device 1100 is the network equipment, the sending unit 1120 is further configured to, before sending the first layer-2 PDU to the relay terminal equipment, send a PDCCH scrambled by adopting a relay-specific RNTI to the relay terminal equipment. The PDCCH is configured to schedule the first layer-2 PDU. Here, the relay-specific RNTI is configured for the relay terminal equipment to determine that the data contained in the first layer-2 PDU is required to be forwarded.

Optionally, if the device 1100 is the network equipment, the device 1100 further includes a receiving unit.

The receiving unit is configured to, before the processing unit 1110 generates the first layer-2 PDU, receive a bearer establishment request, the bearer establishment request containing the terminal equipment identifier of the remote terminal equipment.

The processing unit 1110 is further configured to establish an EPS bearer of the remote terminal equipment according to the bearer establishment request received by the receiving unit. Here, the EPS bearer includes a cellular data transmission channel between the network equipment and the relay terminal equipment and a D2D data transmission channel between the relay terminal equipment and the remote terminal equipment.

The sending unit 1120 is further configured to send a bearer establishment response to the relay terminal equipment, the bearer establishment response containing configuration information of the EPS bearer.

Optionally, the configuration information of the EPS bearer may include MAC-layer configuration information and PHY-layer configuration information, or may further include at least one of PDCP-layer configuration information or RLC-layer configuration information.

In an optional example, the device 1100 may specifically be the sender equipment in the abovementioned embodiment, and the device 1100 may be configured to execute each flow and/or step corresponding to the sender equipment in the abovementioned method embodiment and will not be elaborated herein to avoid repetitions.

Figure 13:
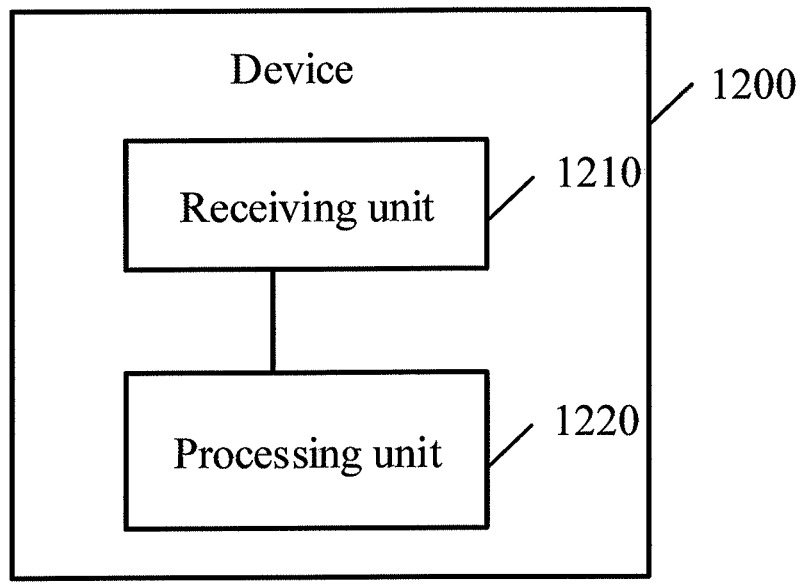
FIG. 13 is a schematic block diagram of another relay transmission device according to an embodiment of the disclosure.

FIG. 13 schematically shows another relay transmission device 1200 according to an embodiment of the disclosure. The device 1200 includes a receiving unit 1210 and a processing unit 1210.

The receiving unit 1210 is configured to receive a second layer-2 PDU sent by relay terminal equipment. The second layer-2 PDU is generated by the relay terminal equipment according to a first layer-2 PDU sent by sender equipment. The first layer-2 PDU contains identification information of a remote terminal equipment, or the first layer-2 PDU is scheduled through a PDCCH scrambled by adopting an RNTI of the remote terminal equipment.

The processing unit 1220 is configured to determine the remote terminal equipment corresponding to the second layer-2 PDU received by the receiving unit 1210.

Here, the sender equipment is the remote terminal equipment and the device 1200 is network equipment, or the sender equipment is the network equipment and the device 1200 is the remote terminal equipment.

Optionally, the identification information of the remote terminal equipment includes a terminal equipment identifier of the remote terminal equipment or a layer-2 identifier of the remote terminal equipment.

Optionally, if the device 1200 is the remote terminal equipment, the second layer-2 PDU contains the terminal equipment identifier of the remote terminal equipment. In such case, the processing unit 1220 is specifically configured to determine the remote terminal equipment corresponding to the second layer-2 PDU according to the terminal equipment identifier contained in the second layer-2 PDU.

Optionally, if the device 1200 is the network equipment, the receiving unit 1210 is further configured to, before receiving the second layer-2 PDU sent by the relay terminal equipment, receive a preamble corresponding to the remote terminal equipment from the relay terminal equipment. In such case, the device 1200 further includes a sending unit. The sending unit is configured to send an uplink grant to the relay terminal equipment according to the preamble received by the receiving unit 1210. The uplink grant indicates an uplink transmission resource allocated by the network equipment.

The receiving unit 1210 is specifically configured to receive the second layer-2 PDU sent by the relay terminal equipment by adopting the uplink transmission resource indicated by the uplink grant sent by the sending unit.

The processing unit 1220 is specifically configured to determine the remote terminal equipment corresponding to the second layer-2 PDU according to the uplink transmission resource occupied by the second layer-2 PDU.

Optionally, if the device 1200 is the network equipment, the receiving unit 1210 is further configured to, before receiving the second layer-2 PDU sent by the relay terminal equipment, receive a BSR sent by the relay terminal equipment. Here, the BSR contains the identification information of the remote terminal equipment. In such case, the device 1200 further includes a sending unit. The sending unit is configured to send the PDCCH to the relay terminal equipment according to the BSR received by the receiving unit 1210. The PDCCH contains the identification information of the remote terminal equipment.

The processing unit 1220 is specifically configured to determine the remote terminal equipment corresponding to the second layer-2 PDU according to the PDCCH configured to schedule the second layer-2 PDU.

Optionally, if the device 1200 is the network equipment, the identification information of the remote terminal equipment includes the terminal equipment identifier of the remote terminal equipment. The second layer-2 PDU contains the layer-2 identifier of the remote terminal equipment. In such case, the processing unit 1220 is specifically configured to determine the remote terminal equipment corresponding to the second layer-2 PDU according to the layer-2 identifier contained in the second layer-2 PDU.

In an optional example, the device 1200 may specifically be the receiver equipment in the abovementioned embodiment, and the device 1200 may be configured to execute each flow and/or step corresponding to the receiver equipment in the abovementioned method embodiment and will not be elaborated herein to avoid repetitions.

It is to be understood that each of the device 900, the device 1100 and the device 1200 is implemented in form of functional unit. Term "unit" mentioned herein may refer to an Application Specific Integrated Circuit (ASIC), an electronic circuit, a processor (for example, a shared processor, a dedicated processor or a group processor) and memory configured to execute one or more software or firmware programs, a combined logical circuit and/or another proper component supporting the described functions.

Figure 14:
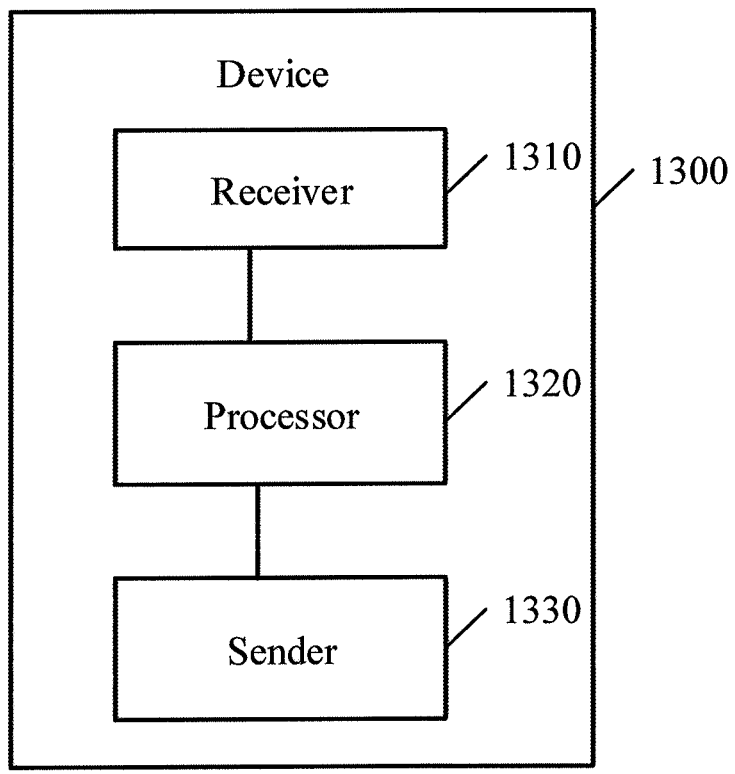
FIG. 14 is a schematic block diagram of another relay transmission device according to an embodiment of the disclosure.

FIG. 14 shows a relay transmission device 1300 according to an embodiment of the disclosure. The device 1300 includes a receiver 1310, a processor 1320 and a sender 1330.

The receiver 1310 is configured to receive a first layer-2 PDU which is intended to be sent from a sender equipment to a receiver equipment. Here, the first layer-2 PDU contains identification information of a remote terminal equipment, or the first layer-2 PDU is scheduled through a PDCCH scrambled by adopting an RNTI of the remote terminal equipment.

The processor 1320 is configured to generate a second layer-2 PDU according to the first layer-2 PDU received by the receiver 1310.

The sender 1330 is configured to send the second layer-2 PDU generated by the processor 1320 to the receiver equipment.

Here, the sender equipment is the remote terminal equipment and the receiver equipment is a network equipment, or the sender equipment is the network equipment and the receiver equipment is the remote terminal equipment.

It is to be understood that the device 1300 may specifically be the relay terminal equipment in the abovementioned embodiment and is configured to execute each step and/or flow corresponding to the relay terminal equipment in the abovementioned method embodiment. Optionally, the device 1300 may further include a memory, and the memory may include a Read-Only Memory (ROM) and a Random Access Memory (RAM), and provides an instruction and data for the processor. A part of the memory may further include a nonvolatile RAM. For example, the memory may further store information about an equipment type. The processor may be configured to execute the instruction stored in the memory, and when the processor executes the instruction stored in the memory, the processor is configured to execute each step and/or flow of the abovementioned method embodiment.

Figure 15:
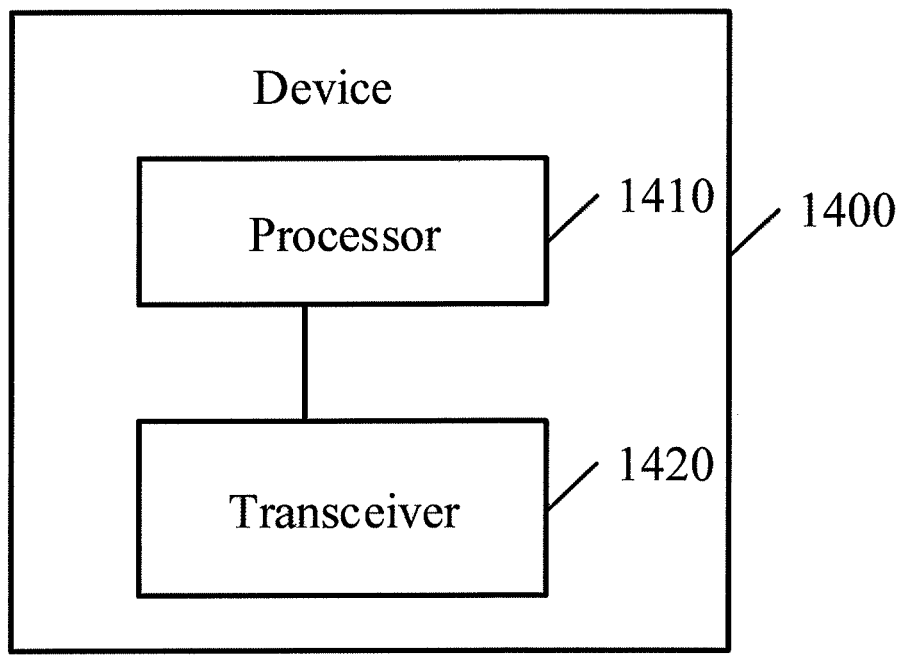
FIG. 15 is a schematic block diagram of another relay transmission device according to an embodiment of the disclosure.

FIG. 15 schematically shows another relay transmission device 1400 according to an embodiment of the disclosure. The device 1400 includes a processor 1410 and a transceiver 1420.

The processor 1410 is configured to perform encapsulation processing on data to be sent to a receiver equipment to generate a first layer-2 PDU. Here, the first layer-2 PDU contains identification information of a remote terminal equipment, or the first layer-2 PDU is scheduled through a PDCCH scrambled by adopting an RNTI of the remote terminal equipment.

The transceiver 1420 is configured to send the first layer-2 PDU generated by the processor 1410 to a relay terminal equipment.

Here, the device 1400 is the remote terminal equipment and the receiver equipment is a network equipment, or the device 1400 is the network equipment and the receiver equipment is the remote terminal equipment.

It is to be understood that the device 1400 may specifically be the sender equipment in the abovementioned embodiment and is configured to execute each step and/or flow corresponding to the sender equipment in the abovementioned method embodiment. Optionally, the device 1400 may further include a memory, and the memory may include a ROM and a RAM, and provides an instruction and data for the processor. A part of the memory may further include a nonvolatile RAM. For example, the memory may further store information about an equipment type. The processor may be configured to execute the instruction stored in the memory, and when the processor executes the instruction stored in the memory, the processor is configured to execute each step and/or flow of the abovementioned method embodiment.

Figure 16:
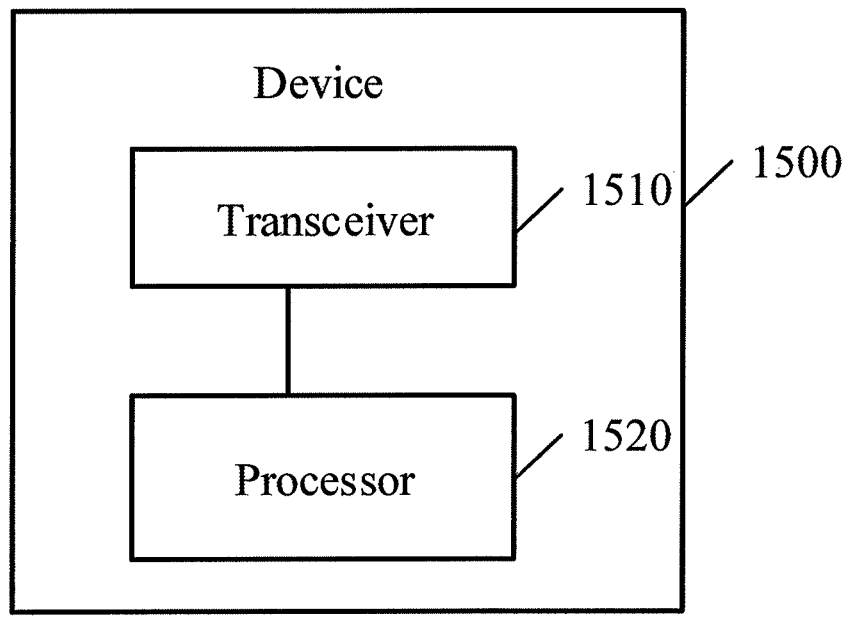
FIG. 16 is a schematic block diagram of another relay transmission device according to an embodiment of the disclosure.

FIG. 16 schematically shows another relay transmission device 1500 according to an embodiment of the disclosure. The device 1500 includes a transceiver 1510 and a processor 1520.

The transceiver 1510 is configured to receive a second layer-2 PDU sent by relay terminal equipment. The second layer-2 PDU is generated by the relay terminal equipment according to a first layer-2 PDU sent by sender equipment. The first layer-2 PDU contains identification information of a remote terminal equipment, or the first layer-2 PDU is scheduled through a PDCCH scrambled by adopting an RNTI of the remote terminal equipment.

The processor 1520 is configured to determine the remote terminal equipment corresponding to the second layer-2 PDU received by the transceiver 1510.

Here, the sender equipment is the remote terminal equipment and the device 1500 is network equipment, or the sender equipment is the network equipment and the device 1500 is the remote terminal equipment.

It is to be understood that the device 1500 may specifically be the receiver equipment in the abovementioned embodiment and is configured to execute each step and/or flow corresponding to the receiver equipment in the abovementioned method embodiment. Optionally, the device 1500 may further include a memory, and the memory may include a ROM and a RAM, and provides an instruction and data for the processor. A part of the memory may further include a nonvolatile RAM. For example, the memory may further store information about an equipment type. The processor may be configured to execute the instruction stored in the memory, and when the processor executes the instruction stored in the memory, the processor is configured to execute each step and/or flow of the abovementioned method embodiment.

It is to be understood that, in the embodiment of the disclosure, the processor may be a Central Processing Unit (CPU), and the processor may also be another universal processor, a Digital Signal Processor (DSP), an ASIC, a Field Programmable Gate Array (FPGA) or another programmable logical device, a discrete or transistor logical device, a discrete hardware component and the like. The universal processor may be a microprocessor or the processor may also be any conventional processor and the like.

In an implementation process, each step of the method may be completed through an integrated logical circuit of hardware in the processor or an instruction in a software form. The steps of the method disclosed in combination with the embodiments of the disclosure may directly be embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory, and the processor executes the instruction in the memory to complete the steps of the method in combination with hardware. For avoiding repetitions, no more detailed descriptions will be made herein.

It is understood that, for avoiding repetitions, descriptions about the embodiments of the disclosure emphasize differences between each embodiment and the same or similar parts may refer to each other.

Those of ordinary skilled in the art may realize that the steps and units of each method described in combination with the embodiments disclosed in the disclosure may be implemented by electronic hardware, computer software or a combination of the two. For clearly describing interchangeability of hardware and software, the steps and compositions of each embodiment have been generally described according to functions in the above descriptions. Whether these functions are executed in a hardware or software manner depends on specific applications and design constraints of the technical solutions. Those of ordinary skilled in the art may realize the described functions for each specific application by virtue of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each function unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

When being implemented in form of software functional unit and sold or used as an independent product, the integrated unit may be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer equipment (which may be a personal computer, a server, network equipment or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Various equivalent modifications or replacements are apparent to those skilled in the art within the technical scope disclosed by the disclosure, and these modifications or replacements shall fall within the scope of protection of the disclosure. Therefore, the scope of protection of the disclosure shall be subject to the scope of protection of the claims.

The invention claimed is:

1. A relay transmission system, comprising: a sender equipment, a receiver equipment, and a relay terminal equipment,
wherein the sender equipment is configured to:
perform encapsulation processing on data to be sent to the receiver equipment to generate a first layer-2 Protocol Data Unit (PDU) which is intended to be sent from the sender equipment to the receiver equipment, wherein the first layer-2 PDU contains identification information of a remote terminal equipment and the layer-2 PDU indicates that an outermost layer or highest layer of the data is encapsulated in layer 2 of the equipment, wherein the identification information of the remote terminal equipment comprises a specific identifier of the remote terminal equipment which is configured by a network equipment and a length of the specific identifier is smaller than a length of a terminal equipment identifier, wherein the specific identifier of the remote terminal equipment is configured to uniquely identify the remote terminal equipment during relay transmission; and
send the first layer-2 PDU to the relay terminal equipment;
wherein the relay terminal equipment is configured to:
receive the first layer-2 PDU;
generate a second layer-2 PDU according to the first layer-2 PDU; and
send the second layer-2 PDU to the receiver equipment, wherein the sender equipment is the network equipment and the receiver equipment is the remote terminal equipment,
wherein layer 2 of each of the remote terminal equipment and the network equipment comprises an Adaptation (ADP) layer, the ADP layer is located between the MAC layer and the PDCP layer, and a layer-2 identifier of the remote terminal equipment is contained in the ADP layer, wherein the ADP layer is configured to convert data received from a lower layer and transmitted by adopting various D2D communication technologies into a communication technology unrelated form, and transmit processed data to a upper layer for further processing wherein the first layer-2 PDU contains a relay-specific Logical Channel Identifier (LCID); and
the relay terminal equipment is further configured to, before generating the second layer-2 PDU according to the first layer-2 PDU, determine that the data contained in the first layer-2 PDU is required to be forwarded according to the relay-specific LCID.

2. The system according to claim 1, wherein the relay terminal equipment is specifically configured to:
determine the terminal equipment identifier corresponding to the layer-2 identifier; and
perform encapsulation processing on data contained in the first layer-2 PDU in layer 2 to generate the second layer-2 PDU, wherein the second layer-2 PDU contains the corresponding terminal equipment identifier.

3. The system according to claim 1, wherein the relay terminal equipment is further configured to, before generating the second layer-2 PDU according to the first layer-2 PDU, determine a preamble corresponding to the identification information of the remote terminal equipment;
the relay terminal equipment is further configured to send the preamble to the network equipment;
the relay terminal equipment is further configured to receive an uplink grant which is sent by the network equipment in response to the preamble, the uplink grant indicating an uplink transmission resource allocated by the network equipment; and
the relay terminal equipment is specifically configured to adopt the uplink transmission resource indicated by the uplink grant to send the second layer-2 PDU to the network equipment.

4. The system according to claim 1, wherein the PDU, which is transmitted through a Device-to-Device (D2D) communication interface, of the first layer-2 PDU and the second layer-2 PDU corresponds to a D2D communication technology adopted between the relay terminal equipment and the remote terminal equipment, and the layer-2 PDU, which is transmitted through a cellular communication interface, of the first layer-2 PDU and the second layer-2 PDU is a MAC PDU, and wherein the identification information of the remote terminal equipment is born in a MAC Control Element (CE) field of the MAC PDU.

5. The system according to claim 1, wherein the first layer-2 PDU is a MAC PDU.

6. The system according to claim 1, wherein the first layer-2 PDU contains a relay-specific Logical Channel Identifier (LCID), and the relay-specific LCID is configured for the relay terminal equipment to determine that the data contained in the first layer-2 PDU is required to be forwarded.

7. The system according to claim 1, wherein the sender equipment is further configured to, before sending the first layer-2 PDU to the relay terminal equipment, send a PDCCH scrambled by adopting a relay-specific RNTI to the relay terminal equipment, the PDCCH being configured to schedule the first layer-2 PDU, wherein the relay-specific RNTI is configured for the relay terminal equipment to determine that the data contained in the first layer-2 PDU is required to be forwarded.

8. The system according to claim 1, wherein the sender equipment is further configured to: before generating the first layer-2 PDU, receive a bearer establishment request, the bearer establishment request containing the terminal equipment identifier of the remote terminal equipment, wherein
the sender equipment is further configured to establish an Evolved Packet System (EPS) bearer of the remote terminal equipment according to the bearer establishment request, wherein the EPS bearer comprises a cellular data transmission channel between the network equipment and the relay terminal equipment and a D2D data transmission channel between the relay terminal equipment and the remote terminal equipment; and
the sender equipment is further configured to send a bearer establishment response to the relay terminal equipment, the bearer establishment response containing configuration information of the EPS bearer,
wherein the configuration information of the EPS bearer comprises MAC-layer configuration information and Physics (PHY)-layer configuration information; or the configuration information of the EPS bearer comprises the MAC-layer configuration information and the PHY-layer configuration information, and comprises at least one of PDCP-layer configuration information or RLC-layer configuration information.

9. The system according to claim 8, wherein the configuration information of the EPS bearer comprises at least one of the layer-2 identifier or RNTI allocated to the remote terminal equipment by the network equipment.

10. The system according to claim 1, wherein the receiver equipment is further configured to:
  receive the second layer-2 Protocol Data Unit (PDU) sent by the relay terminal equipment, the second layer-2 PDU being generated by the relay terminal equipment according to the first layer-2 PDU sent by sender equipment; and
  determine the remote terminal equipment corresponding to the second layer-2 PDU.

11. The system according to claim 10, wherein the second layer-2 PDU contains the terminal equipment identifier of the remote terminal equipment; and
  the receiver equipment is specifically configured to determine the remote terminal equipment corresponding to the second layer-2 PDU according to the terminal equipment identifier contained in the second layer-2 PDU.

12. The system according to claim 10, wherein if the receiver equipment is the network equipment, the identification information of the remote terminal equipment comprises the terminal equipment identifier of the remote terminal equipment, and the second layer-2 PDU contains the layer-2 identifier of the remote terminal equipment; and
  the receiver equipment is specifically configured to determine the remote terminal equipment corresponding to the second layer-2 PDU according to the layer-2 identifier contained in the second layer-2 PDU.

13. The system according to claim 1, wherein the ADP layer is configured to encapsulate and parse the identification information of the remote terminal equipment, when the remote terminal equipment or the network equipment has data to be sent, the data to be sent is sequentially encapsulated through the PDCP layer, the RLC layer and the ADP layer, wherein a relay-specific LCID is contained in the ADP layer, and the relay-specific LCID is configured to identify relay data.

* * * * *